(12) United States Patent
IJntema et al.

(10) Patent No.: US 12,126,494 B2
(45) Date of Patent: Oct. 22, 2024

(54) PROVIDING INTERFACE BETWEEN NETWORK MANAGEMENT AND SLICE MANAGEMENT

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Wieger IJntema, Rotterdam (NL); Pieter Nooren, Delft (NL)

(73) Assignees: KONINKLIJKE KPN N.V., Rotterdam (NL); NEDERLANDSE ORGANISATIE VOOR TOEGEPAST-NATUURWETEN-SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 17/780,623

(22) PCT Filed: Dec. 4, 2020

(86) PCT No.: PCT/EP2020/084586
§ 371 (c)(1),
(2) Date: May 27, 2022

(87) PCT Pub. No.: WO2021/110894
PCT Pub. Date: Jun. 10, 2021

(65) Prior Publication Data
US 2023/0006884 A1 Jan. 5, 2023

(30) Foreign Application Priority Data

Dec. 4, 2019 (EP) .................................. 19213388

(51) Int. Cl.
*H04L 41/0897* (2022.01)
*H04L 41/12* (2022.01)
(Continued)

(52) U.S. Cl.
CPC .......... *H04L 41/0897* (2022.05); *H04L 41/12* (2013.01); *H04L 41/5032* (2013.01);
(Continued)

(58) Field of Classification Search
CPC . H04L 41/5051; H04L 41/12; H04L 41/5045; H04L 47/781; G06Q 20/065
See application file for complete search history.

(56) References Cited

U.S. PATENT DOCUMENTS 9,497,136 B1 11/2016 Ramarao et al.
10,361,843 B1 * 7/2019 Suthar .................. G06Q 20/065
(Continued)

FOREIGN PATENT DOCUMENTS

CN 101547150 A 9/2009
CN 106922002 A 7/2017
(Continued)

OTHER PUBLICATIONS

Qiang, L., et al., "Technology Independent Information Model for Network Slicing; draft-qiang-coms-netslicing-information-model-01," Internet Engineering Task Force, pp. 1-25, Standard working draft, Internet Society, Rue Des Falaises Ch- 120, No. 1 (2017).
(Continued)

*Primary Examiner* — Barbara B Anyan
(74) *Attorney, Agent, or Firm* — Hamilton, Brook, Smith & Reynolds, P.C.

(57) ABSTRACT

Next generation network architectures enable instantiation of network slices in which traffic may be transported via one or more virtual networks overlaying the physical network infrastructure. To enable a slice management system to be able to obtain information on virtual networks of instantiated network slices, such as utilization data indicative of at least one of: a bandwidth capacity, computing capacity and storage capacity of one or more physical links via which traffic
(Continued)

of the virtual networks is routed, an interfacing system is provided. The interfacing system may establish an interface between the slice management system operating in the domain of network slices and the network management system operating in the domain of physical network equipment, and thereby enable the slice management system to take into account such utilization data in its slice management operation.

16 Claims, 12 Drawing Sheets

(51) Int. Cl.
     *H04L 41/50*      (2022.01)
     *H04L 41/5041*    (2022.01)
     *H04L 41/5051*    (2022.01)
     *H04L 43/0817*    (2022.01)
     *H04L 43/0882*    (2022.01)
     *H04L 47/78*      (2022.01)

(52) U.S. Cl.
     CPC ...... *H04L 41/5045* (2013.01); *H04L 41/5051* (2013.01); *H04L 43/0817* (2013.01); *H04L 43/0882* (2013.01); *H04L 47/781* (2013.01)

(56)                References Cited

U.S. PATENT DOCUMENTS

| | | |
|---|---|---|
| 10,440,642 B2 | 10/2019 | Zait |
| 10,506,489 B2 | 12/2019 | Vrzic |
| 10,644,955 B2 | 5/2020 | Zhang et al. |
| 10,986,540 B2 | 4/2021 | Bor et al. |
| 11,051,210 B2 | 6/2021 | Sciancalepore et al. |
| 11,470,620 B2 | 10/2022 | IJntema et al. |
| 11,916,734 B2 | 2/2024 | D'Acunto et al. |
| 2011/0249685 A1 | 10/2011 | Liang et al. |
| 2013/0339495 A1 | 12/2013 | Mower et al. |
| 2016/0352924 A1 | 12/2016 | Senarath et al. |
| 2016/0353367 A1 | 12/2016 | Vrzic et al. |
| 2016/0353465 A1 | 12/2016 | Vrzic et al. |
| 2017/0086118 A1 | 3/2017 | Vrzic |
| 2017/0208019 A1 | 7/2017 | Shimojou et al. |
| 2017/0366399 A1 | 12/2017 | Li et al. |
| 2018/0013680 A1 | 1/2018 | Bull et al. |
| 2018/0077024 A1 | 3/2018 | Zhang |
| 2018/0123878 A1 | 5/2018 | Li et al. |
| 2018/0131578 A1 | 5/2018 | Cui et al. |
| 2018/0132117 A1 | 5/2018 | Senarath et al. |
| 2018/0132138 A1 | 5/2018 | Senarath et al. |
| 2018/0139129 A1 | 5/2018 | Dowlatkhah et al. |
| 2018/0199279 A1 | 7/2018 | Baek et al. |
| 2018/0220276 A1 | 8/2018 | Senarath et al. |
| 2018/0260200 A1 | 9/2018 | Karagiannis et al. |
| 2018/0316627 A1 | 11/2018 | Cui et al. |
| 2019/0089780 A1 | 3/2019 | Yousaf et al. |
| 2019/0109768 A1 | 4/2019 | Senarath et al. |
| 2019/0174320 A1 | 6/2019 | Kodaypak et al. |
| 2019/0174322 A1 | 6/2019 | Deviprasad et al. |
| 2019/0174347 A1 | 6/2019 | Dowlatkhah et al. |
| 2019/0174449 A1 | 6/2019 | Shan et al. |
| 2019/0182876 A1 | 6/2019 | Ying et al. |
| 2019/0342761 A1 | 11/2019 | Yu et al. |
| 2019/0357129 A1 | 11/2019 | Park et al. |
| 2019/0357130 A1 | 11/2019 | Garcia et al. |
| 2020/0044909 A1 | 2/2020 | Huang et al. |
| 2020/0045548 A1 | 2/2020 | Dowlatkhah et al. |
| 2020/0053083 A1 | 2/2020 | Kunz et al. |
| 2020/0154292 A1 | 5/2020 | Bor-Yaliniz et al. |
| 2021/0067421 A1 | 3/2021 | Kidd et al. |
| 2021/0345357 A1* | 11/2021 | IJntema ............... H04L 47/781 |
| 2021/0392040 A1* | 12/2021 | Kerboeuf ............ H04L 41/5045 |
| 2022/0158903 A1* | 5/2022 | D'Acunto ............... H04L 41/12 |
| 2022/0239568 A1* | 7/2022 | Celozzi ............... H04L 41/5051 |
| 2022/0256439 A1 | 8/2022 | Casati et al. |
| 2022/0338151 A1 | 10/2022 | Tang |
| 2022/0394396 A1 | 12/2022 | Gallgo |
| 2022/0417758 A1 | 12/2022 | Nooren et al. |
| 2023/0007662 A1 | 1/2023 | IJntema et al. |
| 2023/0031777 A1 | 2/2023 | IJntema et al. |
| 2023/0217362 A1 | 7/2023 | Sharma et al. |

FOREIGN PATENT DOCUMENTS

| | | |
|---|---|---|
| CN | 107087255 A | 8/2017 |
| CN | 107113195 A | 8/2017 |
| CN | 107743100 A | 2/2018 |
| CN | 108270823 A | 7/2018 |
| CN | 108293004 A | 7/2018 |
| CN | 108566659 A | 9/2018 |
| CN | 109120426 A | 1/2019 |
| CN | 109391498 A | 2/2019 |
| CN | 109417731 A | 3/2019 |
| EP | 3396997 A1 | 10/2018 |
| WO | 2017197273 A1 | 11/2017 |
| WO | 2018000239 A1 | 1/2018 |
| WO | 2018/035431 A1 | 2/2018 |
| WO | 2018067780 A1 | 4/2018 |
| WO | 2018089634 A1 | 5/2018 |
| WO | 2018/137499 A1 | 8/2018 |
| WO | 2018/169382 A1 | 9/2018 |
| WO | 2018196793 A1 | 11/2018 |
| WO | WO2018/228674 A1 | 12/2018 |
| WO | 2019064274 A1 | 4/2019 |
| WO | 2019/160390 A1 | 8/2019 |
| WO | 2019184967 A1 | 10/2019 |
| WO | WO2019/206396 A1 | 10/2019 |
| WO | 2020/074687 A1 | 4/2020 |
| WO | 2020/193394 A1 | 10/2020 |
| WO | 2021/110894 A1 | 6/2021 |
| WO | 2021/122516 A1 | 6/2021 |
| WO | 2021/123411 A1 | 6/2021 |

OTHER PUBLICATIONS

3rd Generation Partnership Project; Technical Specification Group Services and System Aspects; Management and Orchestration; Concepts, Use Cases and Requirements (Release 16), 3GPP TS 28.530 V16.0.0, Technical Specification, pp. 1-29 (2019).

3rd Generation Partnership Project; Technical Specification Group Services and System Aspects; Management and orchestration; Architecture framework (Release 16), 3GPP TS 28.533 V16.1.0 Technical Specification, pp. 1-27 (2019).

3rd Generation Partnership Project; Technical Specification Group Services and System Aspects; Telecommunication management; Study on management and orchestration of network slicing for next generation network (Release 15), 3GPP TR 28.801 V15.1.0 Technical Report, pp. 1-75 (2018).

Network Functions Virtualisation (NFV); Management and Orchestration ETSI GS NFV-MAN 001 v 1.1.1 pp. 1-184 (2014).

International Search Report and Written Opinion for International Appl. No. PCT/EP2020/084586, entitled "Providing Interface Between Network Management and Slice Management," consisting of 13 pages. Date of Mailing: Feb. 4, 2021.

Wang, R., et al., Survey of 5G network slicing, Journal of Nanjing University of Posts and Telecommunications (Natural Science Edition, vol. 38(5), Oct. 2018, 9 pages.

Kotulski, Z., et al., Towards constructive approach to end-to-end slice isolation in 5G networks, EURASIP Journal on Information Security, (2018) 2018:2, 23 pages.

Ren, C., et al., Network Slicing: Building Customizable 5G Network, ZTE Technology Journal, Feb. 2018, vol. 24(1) 5 pages.DOI: 10.3969/j.issn.1009-6868.2018.01.006.

Silver D.S., et al., An Invariant for Open Virtual Strings, Journal of Knot Theory and Its Ramifications, Oct. 2004, 10 pages.

3GPP TR 29.890 V1.2.0 Technical Specification Group Core Network and Terminals; Study on CT WG3 Aspects of 5G System—Phase 1; Stage 3 (Release 15) (Dec. 2017).

(56) References Cited

OTHER PUBLICATIONS

Wang, Q., et al., "Architecture and Key technologies of 5G Transport Network Slicing," ZTE Technology Journal, 24(1):58-61 (Feb. 2018).

3GPP TS 28.531 V16.3.0 (Sep. 2019), Technical Specification, 3rd Generation Partnership Project; Technical Specification Group Services and System Aspects; Management and orchestration; Provisioning (Release 16).

ETSI GS NFV-MAN 001 VI .1.1 (Dec. 2014), Network Functions Virtualisation (NFV); Management and Orchestration.

3GPP TS 22.261 v16.3.0, 3rd Generation Partnership Project; Technical Specification Group Services and System Aspects; Service requirements for the 5G system; Stage 1 (Release 16) (Mar. 2018).

3GPP TS 23.502 V16.2.0 (Sep. 2019), Technical Specification, 3rd Generation Partnership Project; Technical Specification Group Services and System Aspects; Procedures for the 5G System (SGS); Stage 2 (Release 16).

3rd Generation Partnership Project (3GPP) TS 23.501 VI6.2.0 (Sep. 2019), Technical Specification, 3rd Generation Partnership Project; Technical Specification Group Services and System Aspects; System Architecture for the 5G System (SGS); Stage 2 (Release 16).

China Telecom et al: "Discussion on network slice priority", 3GPP Draft; S5-185607 Discussion on Network Slice Priority, 3rd Generation Partnership Project (3GPP), Mobile Competence Centre ; 650, Route Des Lucioles ; F-06921 Sophia-Antipolis Cedex ; France • vol. SA WG5, No. Belgrade (Serbia); Aug. 20, 2018-Aug. 24, 2018 Aug. 24, 2018 (Aug. 24, 2018), XP051544208.

Hua Wei, "Add use case and requirement for network slice instance priority", 3GPP Draft; S5-175111 PCR 28 530 Add Use Case and Requirement for Network Slice Instance Priority, 3rd Generation Partnership Project (3GPP), Oct. 16, 2017-Oct. 20, 2017: F-069(SA WG5) (Oct. 15, 2017).

International Search Report and Written Opinion dated Jan. 13, 2020, for International Application No. PCT/EP2019/077560, entitled: "Dynamic Slice Priority Handling," filed Oct. 11, 2019.

Notice of Allowance for U.S. Appl. No. 17/281,529 dated Apr. 20, 2022.

Notice of Allowance for U.S. Appl. No. 17/281,529 dated Jun. 10, 2022.

Qualcomm Incorporated: "(TP for NR BL CR for TS 38.413): General Fallback", 3GPP Draft; R3-184685 General Fallback, Aug. 11, 2018.

U.S. Non-Final Office Action for U.S. Appl. No. 17/930,183, dated Jan. 5, 2023.

* cited by examiner

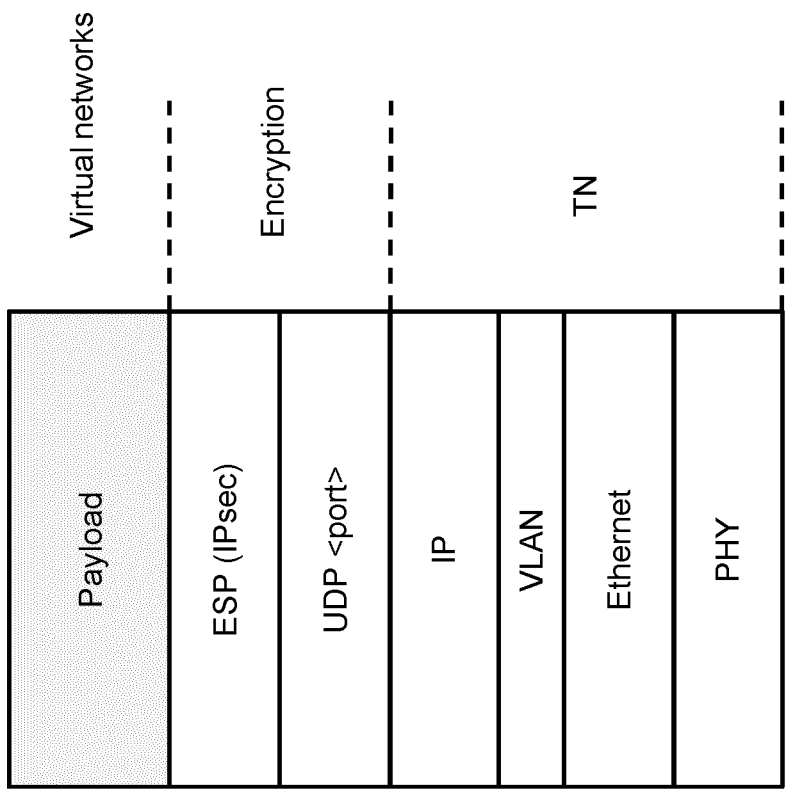

PROVIDING INTERFACE BETWEEN NETWORK MANAGEMENT AND SLICE MANAGEMENT

This application is the U.S. National Stage of International Application No. PCT/EP2020/084586, filed Dec. 4, 2020, which designates the U.S., published in English, and claims priority under 35 U.S.C. § 119 or 365(c) to European Application No. 19213388.2, filed Dec. 4, 2019. The entire teachings of the above applications are incorporated herein by reference.

FIELD OF THE INVENTION

The invention relates to an interfacing system and computer-implemented method for establishing an interface between a network management system and a slice management system of a telecommunication network. The invention further relates to the slice management system and to a network virtualization system and to a computer program comprising instructions for performing said method.

BACKGROUND ART

Telecommunication networks are typically deployed on physical network equipment. This network equipment may for example comprise ethernet cables, optical-fiber cables, routers and switches. Following 3GPP TS28.530 [1], the combination of this network equipment may be referred to as a 'Transport Network' (TN). A TN management system may be used to manage the TN physical layer. The TN management system may monitor active devices in the transport network.

Next generation network architectures, such as 5G, may separate network functions from the underlying physical network equipment. For that purpose, so-called Network Virtualization (NV) techniques may be used, and in particular Network Function Virtualization (NFV) techniques which provide network functions that are instantiable in software using the hardware of one or more of the network nodes.

A design target of 5G and similar next generation network architectures is to provide networks which may be 'tailored' to the requirements of the applications which use the network. Such tailoring may be obtained by instantiation of different network slices which represent virtual networks with different feature sets, e.g., providing different network functions and/or having different network characteristics. Such network slices may be instantiated and managed by a slice management system, such as in the case of 5G network architecture, a 3GPP slice management system.

Network slicing typically builds on the ability to have multiple virtual networks on top of a single TN, i.e., as 'overlay networks'. While network slices may represent more than only virtual networks, network slices typically do depend on these virtual networks. Accordingly, it may be desired by a slice management system to be able to obtain information on virtual networks of instantiated network slices, such as utilization data indicative of at least one of: a bandwidth capacity, computing capacity and storage capacity of the one or more physical links via which traffic of the virtual networks are routed. This may, for example, enable the slice management system to verify that the virtual networks are not affected by traffic in other virtual networks (isolation) and that the virtual networks provide Quality of Service (QoS) in accordance with requirements set by the slice management system.

Disadvantageously, a TN management system may currently be unable to provide information on virtual networks of instantiated network slices to a slice management system, and even if it were able to do so, the slice management system would not be able to relate the virtual networks to instantiated network slices. As such, current slice management systems may be unable to verify that, for example, the virtual networks are not affected by traffic in other virtual networks or that the virtual networks provide QoS in accordance with requirements set by the slice management system.

REFERENCES

[1] 3GPP TS 28.530 V16.0.0 (2019-09), *Technical Specification, 3rd Generation Partnership Project; Technical Specification Group Services and System Aspects; Management and orchestration; Concepts, use cases and requirements*, (Release 16)

SUMMARY OF THE INVENTION

There may be a need for a slice management system to be able to obtain information on virtual networks of instantiated network slices, such as utilization data indicative of at least one of: a bandwidth capacity, computing capacity and storage capacity of one or more physical links via which traffic of the virtual networks is routed.

Such information may be desired so as to enable the slice management system to, for example, verify that the virtual networks are not affected by traffic in other virtual networks, or that the virtual networks provide QoS in accordance with requirements set by the slice management system.

In accordance with a first aspect of the invention, an interfacing system and computer-implemented method may be provided for establishing an interface between a network management system and a slice management system of a telecommunication network, wherein:
  the network management system may be configured for managing physical network equipment of a network having physical links, wherein the network may support instantiation of virtual networks over the physical links, and wherein the network management system may be configured for administering, for a respective virtual network, via which one or more physical links traffic of the virtual network is routed,
  the slice management system may be configured for instantiating and managing network slices which each comprise one or more of the virtual networks, and
  the telecommunication network may comprise a network virtualization system which may be configured for instantiating virtual networks based on network service descriptions which represent respective network slices and administrating which one or more virtual networks are comprised in a respective network slice.
The interfacing system may comprise:
  a data communication interface subsystem for communicating with the slice management system, the network management system and the network virtualization system;
  a processor subsystem which may be configured to, via the data communication interface subsystem:
    obtain identification data from the network virtualization system, wherein the identification data may identify, for at least one network slice, which one or more virtual networks are comprised in the respective network slice;

based on the identification data, obtain utilization data from the network management system, wherein the utilization data may be indicative of at least one of: a bandwidth capacity, computing capacity and storage capacity of one or more physical links via which traffic of the one or more virtual networks is routed; and provide the utilization data for the at least one network slice to the slice management system.

The computer-implemented method may comprise:

obtaining identification data from the network virtualization system, wherein the identification data may identify, for at least one network slice, which one or more virtual networks are comprised in the respective network slice;

based on the identification data, obtaining utilization data from the network management system, wherein the utilization data may be indicative of at least one of: a bandwidth capacity, computing capacity and storage capacity of one or more physical links via which traffic of the one or more virtual networks is routed; and providing the utilization data for the at least one network slice to the slice management system.

In accordance with a further aspect of the invention, a computer-readable medium may be provided, which computer-readable medium may comprise transitory or non-transitory data representing a computer program, the computer program comprising instructions for causing a processor system to perform the method.

The above measures may involve providing a separate interfacing system, or in some embodiments an interfacing subsystem, which may be configured to interface between a network management system and a slice management system of a telecommunication network. Effectively, the system may 'bridge the gap' between the slice management system operating in the domain of network slices and the network management system operating in the domain of physical network equipment. To establish such an interface, the system may make use of existing functionality of a network management system by which the network management system may administer, for a respective virtual network, via which one or more physical links traffic of the virtual network is routed. This functionality by itself may be known per se.

The interfacing system may further involve a third entity in establishing the interface between the network management system and the slice management system, namely a network virtualization system of the telecommunication network, so as to be able to identify which virtual networks are comprised in a respective network slice. Namely, the network virtualization system may instantiate network services based on respective network service descriptions, which may also be referred to as 'network service descriptors'. A network service description or descriptor may be a template for the network virtualization system to instantiate a network service. The instantiation of the network service may involve instantiating one or more virtual networks, which may also be referred to as 'VirtualLinks'. The template may be generated, e.g., by the slice management system, to instantiate a network service for a network slice. The network virtualization system may thus have knowledge on a relation between a network service description (and thereby a corresponding network slice) and the corresponding one or more virtual network (VirtualLinks) which are instantiated for this network slice.

In particular, the interfacing system may obtain identification data from the network virtualization system which identifies which one or more virtual networks are comprised in a respective network slice. The interfacing system may use this identification data to communicate with the network management system on the basis of virtual network identifiers, which the network management system may understand on the basis of administering the relation between virtual networks and physical links. Here, the term 'communicate . . . on the basis of virtual network identifiers' may comprise such identifiers being included in one or more messages exchanged between the interfacing system and the networking management system. Effectively, the identification data may enable the interfacing system to 'translate' from the network slice domain to the virtual network domain, which may be required as the network management system may not have any knowledge on network slices.

In particular, the interfacing system may use the identification data to obtain utilization data from the network management system which relates to the utilization, e.g., in terms of bandwidth, computing capacity or load, memory or persistent storage allocation, of the physical links involved in transporting the traffic of one or more particular virtual networks. The interfacing system may thereby obtain utilization data of the physical links used in/for a particular network slice. To enable the slice management system to act upon such utilization data, the interfacing system may provide the utilization data to the slice management system, for example in response to a request from the slice management system or as a 'push'-type message.

By providing the interfacing system, the slice management system may not need to concern itself with the specifics of virtual networks (or even physical links) while the network management system does not need to concern itself with network slices. Effectively, the interfacing system may provide a mapping between the slice domain managed by the slice management system and the physical layer managed by the network management system by obtaining identification information from a third entity which completes the mapping, namely from the network virtualization system.

A slice management system may now obtain utilization data via the interfacing system which is relevant for instantiated network slices, such as utilization data which is indicative of at least one of: a bandwidth capacity, computing capacity and storage capacity of the physical links via which the traffic of a virtual network of a particular network slice is routed. Such information may be provided in various ways, e.g., as remaining non-allocated capacity, but also by a combination of an allocation percentage and the overall capacity in terms of bandwidth, computing and/or storage. For example, the computing capacity may be indicated as a load. The storage capacity may be a memory capacity and/or a persistent storage capacity, e.g., indicating a storage capacity to cache data such as (parts of) media streams. Such information may enable the slice management system to, for example, verify that the virtual networks are not affected by traffic in other virtual networks, and/or that the virtual networks provide QoS in accordance with requirements set by the slice management system. In a specific example, the utilization data may enable the slice management system to influence or enforce QoS in the virtual networks of network slices.

In some embodiments, the interfacing system may simply pass the utilization data to the slice management system, e.g., in response to a request from the slice management system. In some embodiments, the interfacing system may internally administer a relation between network slices, virtual networks and physical links, e.g., by generating an internal mapping representing said relation. In some embodiments, the interfacing system may internally buffer recent utilization data for the physical links of the administered virtual networks and network slices, which may enable the interfacing system to provide utilization data to the slice management system directly in response to a request from the slice management system. In some embodiments, the interfacing system may be configured to generate overview information relating to the utilization by aggregating or in other ways processing the utilization data obtained from the network management system.

In an embodiment, the processor subsystem may be configured to, based on the identification data, instruct the network management system to monitor the one or more physical links via which the traffic of the one or more virtual networks is routed and to periodically generate the utilization data. In accordance with this embodiment, the interfacing system may request the network management system to monitor certain physical links and to periodically generate the utilization data. This may cause the network management system to instruct routers, switches and/or other network nodes to generate such utilization data, which may then be aggregated or in other ways processed by the network management system before providing the utilization data to the interfacing system. This may be advantageous in case it is desired, for example by the slice management system, to monitor network traffic associated with a particular network slice on a periodic, or a continuous or semi-periodic, basis.

In an embodiment, the processor subsystem may be configured to periodically obtain the utilization data from the network management system by at least one of:
  subscribing with the network management system to periodically receive the utilization data from the network management system; and
  periodically sending a request to the network management system.

In accordance with this embodiment, the interfacing system may periodically request or subscribe-to-periodically-receive the utilization data from the network management system. This may enable the interfacing system to provide up-to-date utilization data to the slice management system, e.g., in response to requests.

In an embodiment, the processor subsystem may be configured to, in response to obtaining the utilization data, instruct the network management system to at least one of:
  re-route at least part of the traffic of the one or more virtual networks via one or more different physical links; and
  apply a quality-of-service configuration to at least part of the traffic of the one or more virtual networks.

The interfacing system may act upon the utilization data by sending instructions to the network management system. Such instructions may for example pertain to the rerouting of traffic, the (re)configuring of QoS, etc., and may for example comprise an identifier of a virtual network or an identifier of a physical network link so as to identify to which virtual network or physical network link the instructions apply.

In an embodiment, the processor subsystem may be configured to instruct the network management system based on instructions from the slice management system. In accordance with this embodiment, the interfacing system may send the instructions to the network management system in response to instructions received from the slice management system. Namely, the slice management system may determine from the utilization data that changes are needed on the physical network level for one or more of the instantiated network slices. Accordingly, the slice management system may instruct the interfacing system to effect those changes by sending appropriate instructions to the network management system. In doing so, the interfacing system may map the instructions from the network slice domain to the virtual network domain, e.g., on the basis of previously obtained identification data and by including an identifier of a virtual network in the instructions to the network management system, and in some embodiments may even map the instructions to the physical network level. The network management system may then effect the requested changes, for example by rerouting traffic, (re) configuring QoS etc.

In an embodiment, the network virtualization system may be a network function virtualization system which comprises a network function virtualization orchestrator and a virtual infrastructure manager, wherein the processor subsystem may be configured to obtain the identification data by:
  obtaining a network identifier from the network function virtualization orchestrator; and
  based on the network identifier, obtaining the identification data from the virtual infrastructure manager.

In accordance with this embodiment, the network virtualization system may specifically be a network function virtualization system, such as the so-called network functions virtualization (NFV) management and network orchestration (MANO) system, e.g., as defined by FIG. 5.1 of [4]. In such an embodiment, the identification data may be obtained in two steps, namely by first obtaining a network identifier from the network function virtualization orchestrator (NFVO) and subsequently obtaining the identification data from the virtual infrastructure manager (VIM) based on the network identifier, for example by providing the network identifier to the virtual infrastructure manager.

In an embodiment, the data communication interface subsystem may comprise one or more network interfaces for communicating with at least one of: the slice management system, the network management system and the network virtualization system. The data communication of the interfacing system may at least in part take place via network communication. In some embodiments, the data communication may at least in part also take place via internal data communication, for example if the interfacing system is a subsystem of the slice management system or the network management system or the network virtualization system. Accordingly, the data communication interface subsystem may comprise multiple interfaces, such as one or more network interfaces and one or more internal (e.g., software-based) interfaces. An example of the latter is an application programming interface (API).

In an embodiment, the network may be a software defined network (SDN), the network management system may be represented by software defined network controller, and the processor subsystem may be configured to obtain the utilization data from the software defined network controller. In case the network is an SDN, the SDN controller may act as, and thus represent, the network management system. Accordingly, the interfacing system may be configured to interface with the SDN controller as being the network management system of the SDN.

In an embodiment, the network management system may be represented by a virtual infrastructure manager, and the processor subsystem may be configured to obtain the utilization data from the virtual infrastructure manager. In accordance with this embodiment, a virtual infrastructure manager may act as, and thus represent, the network management system. Accordingly, the interfacing system may be configured to interface with the virtual infrastructure manager as the network management system.

In an embodiment, the processor subsystem may be configured to:
  obtain identification data for a set or all of the network slices managed by the slice management system;
  obtain utilization data associated with the set or all of the network slices;
  provide the utilization data of a selected network slice to the slice management system in response to receiving an identifier of the selected network slice from the slice management system.

In accordance with this embodiment, the interfacing system may obtain identification data and utilization data for a set of network slices. This may enable the interfacing system to directly respond to requests, e.g., from the slice management system, for utilization data of a particular network slice. Namely, by obtaining said data, the interfacing system may internally buffer utilization data of the physical links of the virtual networks of the set or all of the network slices, which may enable the interfacing system to provide utilization data to the slice management system directly in response to a request from the slice management system. In some embodiments, the interfacing system may explicitly administer a relation between network slices, virtual networks and physical links, e.g., by generating an internal mapping representing said relation. Such a mapping may enable the interfacing system to easily retrieve utilization data for a particular network slice, in that the interfacing system may determine the virtual network(s) in the network slice and the physical links involved in routing the traffic of the virtual network(s) from the mapping.

In a further aspect of the invention, the slice management system may be configured to provide an identifier of the selected network slice to the interfacing system and to receive the utilization data for the selected network slice from the interfacing system. In accordance with this embodiment, the slice management system may communicate with the interfacing system on the basis of identifiers of network slices, e.g., by including the identifiers in one or more messages. The interfacing system may understand such identifiers on the basis of the identification data obtained from the network virtualization system, in that it may be able to map such identifiers to one or more virtual networks which may be enumerated in the identification data.

In an embodiment, the interfacing system may be configured for, if the traffic of a respective virtual network is transmitted via an encrypted tunnel, administering a correspondence between an identifier of the virtual network and a network port via which the traffic enters the encrypted tunnel to enable, based on the network port, identifying and monitoring the at least one of: bandwidth capacity, computing capacity and storage capacity of the one or more physical links via which the traffic of the virtual network is routed. If the traffic of a respective virtual network is encrypted, i.e., transmitted via an encrypted tunnel for at least part of the telecommunication network, it may conventionally not be possible to obtain utilization data which directly relates to the physical links which transport the encrypted traffic of a particular virtual network, as it may not be known, due to the encryption, which physical links transport which traffic. In accordance with this embodiment, the interfacing system may administer a correspondence between an identifier of the virtual network and a network port via which the traffic enters the encrypted tunnel. Since such a network port may remain visible despite the subsequent encryption of the traffic, the interfacing system may still be able to obtain the utilization data for the traffic which is transmitted via the encrypted tunnel on the basis of the network port, for example by specifying the network port instead of the identifier of the virtual network to the network management system. This may enable the interfacing system to provide utilization data for virtual networks which transmit encrypted traffic.

In a further aspect of the invention, the network management system may be configured for, if the traffic of a respective virtual network is transmitted via an encrypted tunnel, administering a correspondence between an identifier of the virtual network and a network port via which the traffic enters the encrypted tunnel to enable, based on the network port, identifying and monitoring the at least one of: bandwidth capacity, computing capacity and storage capacity of the one or more physical links via which the traffic of the virtual network is routed.

In addition or as an alternative to the interfacing system maintaining such a correspondence for virtual networks which encrypted traffic, the network management system may maintain such a correspondence. Accordingly, the interfacing system may request utilization data on the basis of a virtual network identifier, which may then be mapped internally by the network management system to a network port.

In a further aspect of the invention, the slice management system may be configured for, if the traffic of a respective virtual network is transmitted via an encrypted tunnel, requesting the interfacing system and/or the network management system to administer a correspondence between an identifier of the virtual network and a network port via which the traffic enters the encrypted tunnel to enable, based on the network port, identifying and monitoring the at least one of: bandwidth capacity, computing capacity and storage capacity of the one or more physical links via which the traffic of the virtual network is routed. The monitoring of virtual networks which encrypted their traffic may be initiated by the slice management system, which may request the interfacing system and/or the network management system to administer said correspondences between virtual networks, and specifically the identifiers of the virtual networks, and the associated network ports.

In an embodiment, the slice management system may comprise the interfacing system as described in this specification as a subsystem. In accordance with this embodiment, the slice management system may communicate with the interfacing subsystem via internal data communication, for example via an API.

In an embodiment, the slice management system may be configured to generate an alarm signal if the at least one of: bandwidth capacity, computing capacity and storage capacity of the one or more physical links exceeds a threshold. In an embodiment, the slice management system may be further configured to include the alarm signal in an alarm list of the slice management system; and/or provide the alarm signal to an operator of the network slice. The slice management system may be aware of the requirements of the applications which use the network slice, and may thus identify if the bandwidth capacity, computing capacity and/or storage capacity of one or more physical links is insufficient in respect of these requirements. Accordingly, the slice management system may generate an alarm signal if the allocated bandwidth, computational load and/or allocated persistent storage or memory of one or more physical links exceeds a threshold or if the available bandwidth, computing capacity, persistent storage or memory falls below a threshold, such as a static threshold, e.g., based on static application requirements, or a dynamic threshold, e.g., based on dynamic application requirements. For example, the alarm signal may be included in an alarm list of the slice management system, and/or an operator of the particular network slice may be alerted to said exceeding of the threshold by providing the alarm signal.

In an embodiment, the network management system may comprise the interfacing system as described in this specification as a subsystem. In accordance with this embodiment, the network management system may communicate with the interfacing subsystem via internal data communication, for example via an API.

In an embodiment, the telecommunication network may comprise a core network, e.g., of a connectivity provider's network. In an embodiment, the connectivity provider's network may be a network adhering to one or more 3GPP standards.

It will be appreciated by those skilled in the art that two or more of the above-mentioned embodiments, implementations, and/or aspects of the invention may be combined in any way deemed useful.

Modifications and variations of any one of the systems, methods and/or computer programs, which correspond to the described modifications and variations of another one of these systems, methods and/or computer programs, and vice versa, may be carried out by a person skilled in the art on the basis of the present description.

Further References

[2] 3GPP TR 28.801 V15.1.0 (2018-01), *Technical Report, 3rd Generation Partnership Project; Technical Specification Group Services and System Aspects; Telecommunication management; Study on management and orchestration of network slicing for next generation network* (Release 15)

[3] 3GPP TS 28.533 V16.1.0 (2019-09), *Technical Specification, 3rd Generation Partnership Project; Technical Specification Group Services and System Aspects; Management and orchestration; Architecture framework* (Release 16)

[4] ETSI GS NFV-MAN 001 V1.1.1 (2014-12), *Network Functions Virtualisation (NFV); Management and Orchestration*

BRIEF DESCRIPTION OF THE DRAWINGS

These and other aspects of the invention are apparent from and will be elucidated with reference to the embodiments described hereinafter. In the drawings.

FIG. 9C shows an open systems interconnection (OSI) stack in which an additional user datagram protocol (UDP) layer is added;

Figure 1:
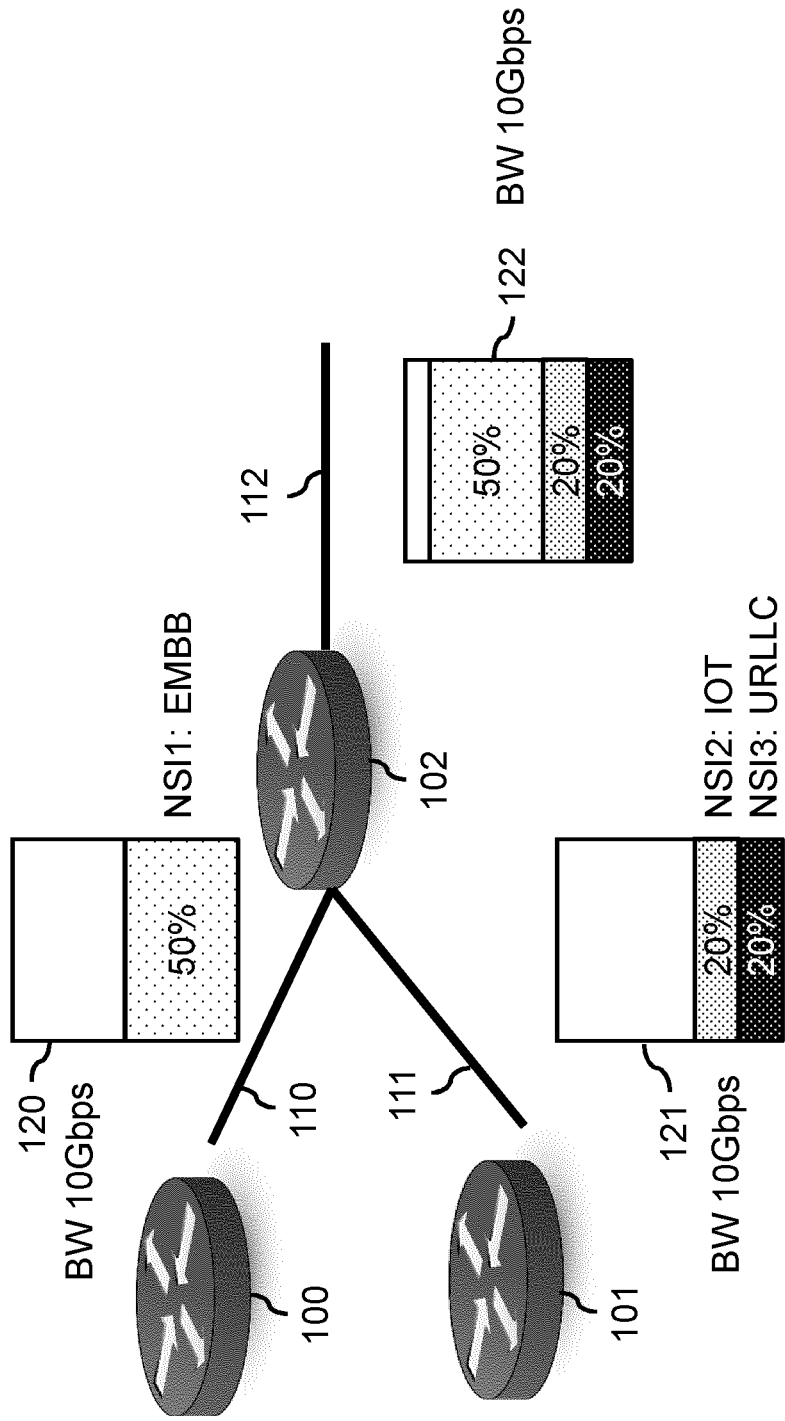
FIG. 1 shows network traffic of different network slices being transported via physical links between transport nodes, and the bandwidth usage per physical link.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.
3GPP 3rd generation partnership project
3GPP-MS 3GPP slice management system
API application programming interface
BW bandwidth
CSMF communication service management function
EMBB enhanced mobile broadband
GRE generic routing encapsulation
IOT Internet of things
IPSEC IP security
IS interfacing system
NFV network functions virtualization
NFV-MANO NFV management and network orchestration
NFVI NFV infrastructure
NFVO NFV orchestrator
NSD network slice description
NSI(X) network slice instance (#X)
NSMF network slice management function
NSSMF network slice subnet management function
OSI open systems interconnection
QOS quality of service
SDN software defined network
TN transport network TN-MS transport network management system
URLLC ultra-reliable low-latency communication
UDP user datagram protocol
VIM virtualized infrastructure manager
VLAN virtual local area network
VNF virtualized network function
VNFM virtualized network function manager
VXLAN virtual extensible local area network
1-6 messages/steps in message flow
1'-4' messages/steps in message flow
1"-4" messages/steps message flow
10 alarm
100-102 physical network node
110-112 physical connection
120-122 bandwidth allocation of physical connection
200 network management system
220 slice management system comprising interfacing system
222 slice management system
240 interfacing system
242 interfacing system as part of network virtualization system
260 network (function) virtualization system
270 network function virtualization orchestrator
280 virtual infrastructure manager
282 virtual infrastructure manager configured to manage transport network
290 network functions virtualization infrastructure
300 edge router
310 router
320 security gateway
330 core network
350 encrypted
360 not encrypted
400 system, e.g. interfacing system
410 data communication interface subsystem
420 processor subsystem
430 data storage
500 computer-readable medium
510 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP and related standards, for example as defined by [1] to [4]. However, the concepts described in the following embodiments may equally apply, mutatis mutandis, to any other type of telecommunication network having a network management system, a slice management system and a network virtualization system as defined by the wording of the appended claims.

FIG. 1 illustrates a context of at least some of the embodiments, showing how network traffic of different network slices may be transported between network nodes. In particular, FIG. 1 shows a physical infrastructure comprised of physical network nodes 100-102, such as routers or switches or similar type of physical network equipment, which may be connected via physical connections 110-112 such as ethernet cables, optical fiber cables, microwave links, satellite links, etc. The combination of such types of physical network equipment and their physical connections is often referred to as a transport network (TN), but may in the following embodiment also be referred to as a 'physical layer' or simply as a 'network' other than a virtual network. Respective parts or segments of the physical infrastructure may be referred to as 'physical links'. A physical link may thus in general comprise one or more physical network nodes, one or more physical connections or a combination of one or more physical network nodes and one or more physical links.

The transport network may support virtual networks. Such virtual networks may be based on VLAN (virtual local area network), VXLAN (virtual extensible LAN), GRE (generic routing encapsulation), MPLS (multiprotocol label switching), LISP (locator/ID separation protocol) or any other overlay network technology.

In the example of FIG. 1, three virtual networks are shown which may be used in respective networks slice instances (NSIs), with NSI1 being used for enhanced mobile broadband (EMBB), NSI2 being used for an internet of things (IOT) application and NSI3 being used for ultra-reliable low-latency communication (URLLC).

FIG. 1 further illustrates the current bandwidth usage 120-122 in relation to the total bandwidth capacity of each respective physical connection 110-112. For example, it can be seen that the virtual network of NSI1 takes up 50% of the 10 Gbps bandwidth 120 of the physical connection 110, that the respective virtual networks of NSI2 and NSI3 take up 20%+20%=40% of the 10 Gbps bandwidth 121 of the physical connection 111 and that all three virtual networks take up 50%+20%+20%=90% of the 10 Gbps bandwidth 122 of the physical connection 112. While the bandwidth capacity of all physical connection 110-112 may be sufficient for the network traffic of the virtual networks of the network slice instances NSI1-NSI3, the bandwidth of at least the physical connection 112 may be easily exceeded, for example if the network traffic of only one of the network slices increases by 1 Gbps. It may therefore occur that a physical connection is at or near its maximum bandwidth capacity.

Although FIG. 1 refers to the bandwidth of physical connections, also physical network nodes such as routers and switches may have a bandwidth which may be exceeded. This also applies to the physical links formed by a combination of physical network nodes and/or physical connections, in that also this combination may have a bandwidth (e.g., as defined by the most limited bandwidth of a respective part of the link, e.g., the 'bottleneck) which may be exceeded. Similar problems may occur with computing capacity, which is typically expressed as a computational load. For example, the computational load of a physical network node, being for example a router or switch, may be limited. Since network routing may cause computational load, the capacity of a router or switch for network routing may be limited, e.g., in terms of numbers of connections. Similar problems may occur with storage. For example, a physical network node may provide persistent storage, e.g., for caching purposes, which may be limited and thus exceeded during operation. Similarly, a physical network node may have a memory of which the memory capacity may be exceeded.

It is noted that the computational capacity of a physical link comprising several physical network nodes may be defined in any suitable manner, e.g., as an aggregated computing capacity or as individual capacities of the respective links or conversely as an individual or aggregated load representing the relation between available and allocated computing capacity. Similarly, the storage capacity of a physical link comprising several physical network nodes may be defined in any suitable manner, e.g., as an aggregated or as individual storage capacity of the respective links.

Given such and similar situations, there may be a need for a slice management system, which may be a system capable of instantiating and subsequently managing the network slice instances NSI1-NSI3, to be able to obtain information on virtual networks of instantiated network slices, and in particular to obtain utilization data indicative of at least one of: a bandwidth capacity, computing capacity and storage capacity of one or more physical links via which traffic of the virtual networks is routed. Such information may be desired so as to enable the slice management system to, for example, verify that the virtual networks are not affected by traffic in other virtual networks, or that the virtual networks provide QoS in accordance with requirements set by the slice management system. For that purpose, an interfacing system may be provided, as described in the following.

Figure 2:
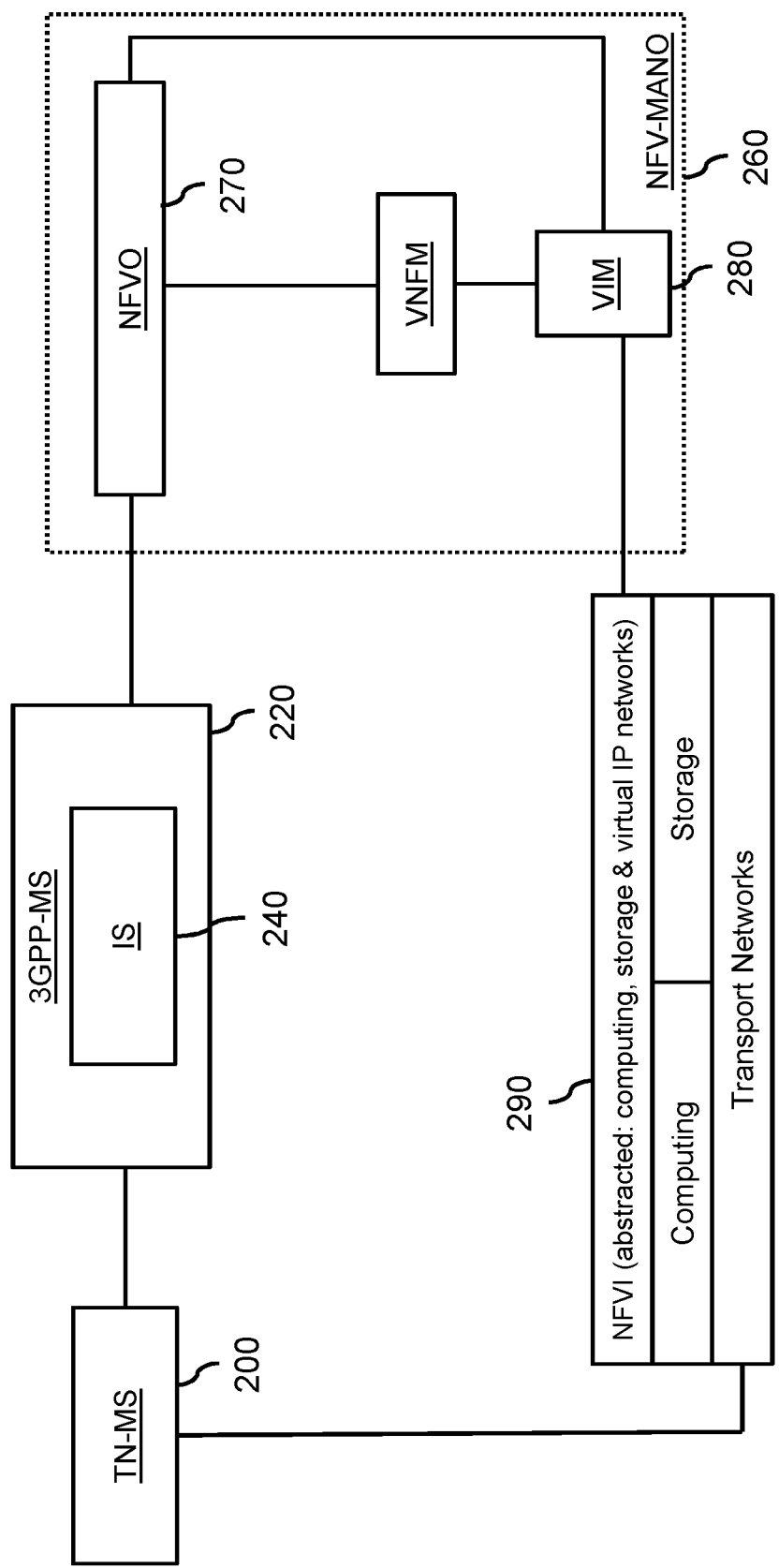
FIG. 2 shows a network management system (TN-MS), a slice management system (3GPP-MS) and an interfacing system (IS) which is configured to interface between the network management system and the slice management system.

FIG. 2 shows a network management system 200, a slice management system 220 and an interfacing system 240 which may be configured to interface between the network management system 200 and the slice management system 220. The network management system 200 may be configured to manage physical network equipment of a network having physical links, which is in FIG. 2 and elsewhere represented by the NFVI 290 which may encompass the physical infrastructure and which may also include partially virtualized functions, see e.g., [4]. The network may support instantiation of virtual networks over the physical links, and the network management system 200 may be configured for administering, for a respective virtual network, via which one or more physical links traffic of the virtual network is routed. The network management system, which may also be considered and therefore referred to as a transport network management system, may be a known type of network management system manufactured by telecommunication equipment manufacturers such as Nokia, Ericsson etc., and is also described in 3GPP, see e.g. FIG. 4.7.1 and its corresponding description in [1].

The slice management system 220 may be configured for instantiating and managing network slices which each comprise one or more of the virtual networks. For example, the slice management system may be a 3GPP slice management system, which may be comprised of one or more of the CSMF, NSMF and NSSMF, e.g., as described in FIG. 4.10.1 and its corresponding description in [2]. The slice management system 220 may interface with a network virtualization system 260.

The network virtualization system 260 may be configured for instantiating virtual networks based on network service descriptors which represent respective network slices and for administrating which one or more virtual networks are comprised in a respective network slice. For example, the network virtualization system 260 may be NFV-MANO as for example described by FIG. 5.1 and its corresponding description in [4]. However, this is not a limitation, in that the network virtualization system may also be a different type of network virtualization system, such as a 'Openstack Heat' (https://wiki.openstack.orq/wiki/Heat)-based system or a network virtualization system based on the Open Network Automation Platform (ONAP, https://www.o-nap.orq/) or in general any other appropriately configured network virtualization system.

During operation, and for example based on service and/or operator requirements for the network slice (NS), the slice management system 220 may create a network service description (NSD) for the network slice (NS), which may then be used by the NFV-MANO to create virtualized network functions (VNFs) and virtual networks that will be part of the NS instance (NSI) from the point of view of the slice management system 220. An example of an interface of a 3GPP slice management system to an NFV-MANO is described by Figure A.4.1 and its corresponding description in [3]. The following table summarizes the correspondence between network slices in the 3GPP domain and network service descriptors in the NFV MANO domain:

| 3GPP domain | NFV-MANO domain |
| --- | --- |
| Network Slice (NS) Network Slice Subnet (NSS) Contains a list of (zero or multiple) NSSs Contains a list of (zero or multiple) Network Functions (NFs) Contains a NsInfo <<datatype>> Which may contain a nsdId (being a reference to an NSD, see right-hand column) | Network Service Descriptor (NSD) Optionally may contain (zero or multiple) NSs (Network Service) Optionally may contain (zero or multiple) VNFs |

It is noted that the term NFV-MANO term 'network service descriptor' may be an example of what is elsewhere referred to as a 'network service description'.

The interfacing system 240 may be provided to establish an interface between the network management system 200 and the slice management system 220. In the example of FIG. 2 and other examples, the interfacing system 240 is shown to be part of the slice management system 220. This is however not a limitation, in that the interfacing system 240 may also be part of the network virtualization system 260 (as described with reference to FIG. 6) or part of a different system or a standalone system.

The interfacing system 240 may be configured to communicate with the slice management system, the network management system and the network virtualization system. In particular, the interfacing system 240 may be configured to obtain identification data from the network virtualization system 260, wherein the identification data identifies, for at least one network slice, which one or more virtual networks are comprised in the respective network slice. The interfacing system 240 may be further configured to, based on the identification data, obtain utilization data from the network management system 200, wherein the utilization data is indicative of at least one of: a bandwidth capacity, computing capacity and storage capacity of one or more physical links via which traffic of the one or more virtual networks is routed. The interfacing system 240 may be further configured to provide the utilization data for the at least one network slice to the slice management system 220, which may involve making the utilization data available as internal data if the interfacing system 240 is an internal part of the slice management system 220.

Due to its interfacing between the network management system 200 and the slice management system 220, the interfacing system 240 may also be referred to as 'STN mapper' (STN: Slice—Transport Network), with the term 'mapper' referring to the system's function of providing a mapping of information from the physical network equipment domain to the network slice domain. In general, the interfacing system 240 may, based on the data obtained from the network management system 200 and the network virtualization system 260, keep track of the virtual networks instantiated on top of the network, e.g., by appropriate data administration. The interfacing system 240 may administer for each virtual network which physical nodes are used and which NSI is supported. The interfacing system 240 may maintain an overview of the data usage per physical link of an NSI. Furthermore, through the interfacing system 240, the slice management system 220 may instruct the network management system 200 to reroute traffic of virtual networks, change certain QoS parameters for traffic flows in the virtual network and/or to limit the bandwidth available for individual virtual networks.

For that purpose, the interfacing system 240 may obtain and exchange various data with the network virtualization system 260, including but not limited to data comprising information on which network slices are using which virtual networks. This information may for example be obtained in the form of a network service descriptor (NSD) which may for example indicate that virtual networks A to C are used in NSI1. In case of an NFV-MANO as network virtualization system, the so-called Os-Nfvo interface may be used to obtain such information. The interfacing system 240 may further obtain information on which virtual network uses which virtual network (overlay) identifier. Such type of information may be available within the network virtualization system 260. For example, in case of an NFV-MANO as network virtualization system, this information may be available in the virtualized infrastructure manager (VIM) 280.

The network management system 200 may collect various information, for example via existing, typically non-standardized interfaces on classical transport network management systems or via various interfaces on software defined network (SDN) controllers. Such collected information may include but not be limited to:

For each router or a set of routers in the network:
CPU and memory load
For each link or a set of links in this router
 The negotiated maximum link speed for this link
 The current total data bandwidth over this link
 The current data bandwidth of each virtual network (overlay) identifier for this link
 Number of dropped packets for this link
 The first hop neighbor identifiers
For each switch or a set of switches in the network
CPU and memory load
For each link or a set of links in this switch
 The negotiated maximum link speed for this link
 The current total data bandwidth over this link
 The current data bandwidth of each virtual network (overlay) identifier for this link
 Number of dropped packets for this link
 The first hop neighbor identifiers From this collected information, the network management system 200 may in some embodiments create and maintain a topology of the physical network, for example by systematically analyzing first hop neighbor identifiers and combining individual links between nodes indicated by these identifiers into an overall topology. Together with the overlay network usage information, the network management system 200 may identify where and which physical links are used by which virtual network. The network management system 200 may collect this information from the physical network equipment, for example in regular time intervals, e.g., between 1 and 30 seconds, but may in other examples also only collect this information on-demand, e.g., in response to a request of the interfacing system 240, or at different intervals.

The interfacing system 240 may be configured to obtain utilization data from the network management system 200. This utilization data (or information) may comprise a subset, or in some cases all of the collected information of the network management system 200. In some embodiments, the interfacing system 240 may obtain specific utilization data, for example associated with a particular network slice or the virtual networks associated with a particular network slice. The interfacing system 240 may obtain this utilization data in various ways, for example by separately requesting such utilization data or by subscribing for such utilization data to be sent. For example, the interfacing system 240 may request, or subscribe for, utilization data indicative of the data bandwidth usage per physical node, utilization data indicative of the data bandwidth usage of the network per physical link, utilization data indicative of the data bandwidth usage for each network slice per physical node, and/or utilization data indicative of the data bandwidth usage for each network slice per physical link. Similar type of information may also be requested relating to computational load, persistent storage usage or capacity and/or to memory usage or capacity.

In accordance with its function of providing an interface between the slice management system 220 and the network management system 200, the interfacing system 240 may also send other requests or instructions to the network management system 200 which may be directly or indirectly based on requests or instructions of the slice management system 220. For example, the interfacing system 240 may be configured to request routing modifications, for example to reroute virtual networks to/over less overloaded physical nodes, or to instruct the network management system 200 to apply and ensure certain QoS for specific virtual networks on the network, or to instruct the network management system 200 to apply and ensure certain QoS for specific traffic flows. The type or degree of QoS may for example be determined by applying a classifier, e.g., a traffic classifier, to characteristics of the traffic flow. Depending on the characteristics, the classifier may indicate a QoS configuration.

In the following, by way of example, the network virtualization system is an NFV-MANO and the network is a transport network. Virtual networks may also be referred to as 'overlay' networks, and their identifiers as 'network overlay identifiers', or in short, as 'overlay identifiers'.

Figure 3:
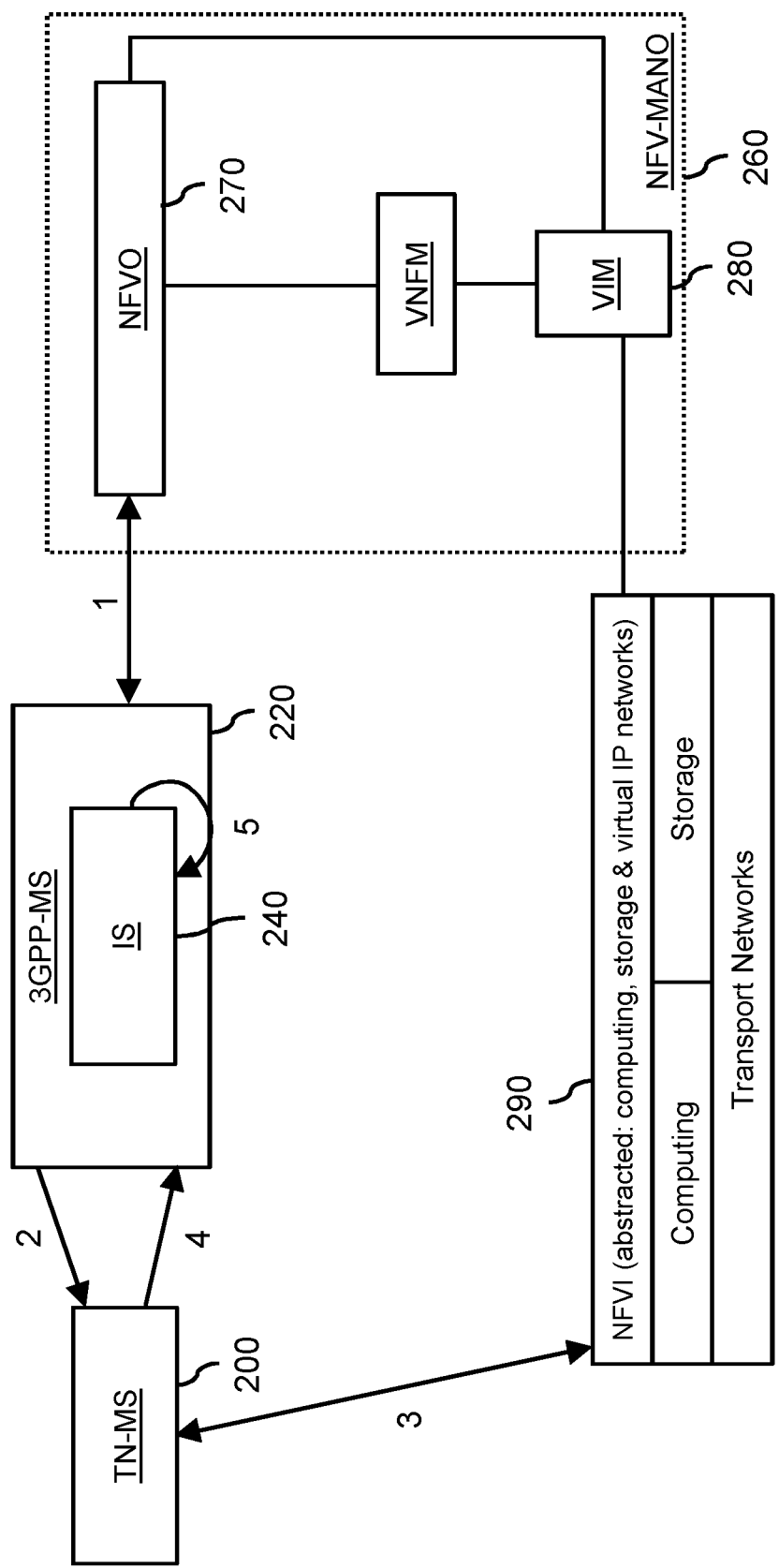
FIG. 3 shows a message flow for monitoring of the network by the slice management system (3GPP-MS) via the interfacing system (IS)

FIG. 3 shows a message flow for monitoring of the network by the slice management system 220 through the interfacing system 240. Herein, reference numbers 1-5 correspond to respective ones of the following messages or steps:

1. The interfacing system 240 may request, for each network slice instance (NSI) mapped to a network slice description (NSD), the virtual networks (VirtualLinks) that are created, for example from the network function virtualization orchestrator (NFVO) of the NFV-MANO via the Os-Nfvo interface. For these virtual networks, the interfacing system 240 may request the NFV-MANO 260 to provide the type of overlay networks and overlay identifier for respective type. As a result, the interfacing system 240 may obtain a list of overlay networks for each network slice.

2. The interfacing system 240 may instruct the network management system 200 to monitor the transport network and the specific overlay networks.

3. The network management system 200 may instruct all or a subset of its routers, switches and/or other network nodes to send utilization data as described elsewhere to the network management system 200, e.g., at particular intervals. In response to the instructions, the network nodes may send such utilization data, which may also be referred to as monitoring data, to the network management system 200.

4. The network management system 200 may periodically send the aggregated utilization data towards the interfacing system 240.

5. The interfacing system 240 may map the utilization data to the NSIs managed by the 3GPP slice management system.

The message flow shown in FIG. 3 may be extended with additional steps or messages, for example to reconfigure the virtual networks over the transport network. This may for example address the following types of network problems:

1. Overloading (e.g., load, bandwidth) of a physical connection and overloading (e.g., load, processing, memory) of a physical node and ports within the physical node.

2. Physical failure of a physical connection or physical node

Since the message flow of FIG. 3 may enable the slice management system 220 to identify which network slice has which impact on which physical link, the slice management system 220 may address these and similar types of network problems based on the obtained utilization data and in some cases based on a policy configuration which may define a policy to be followed in certain situations.

For example, if a physical node or connection with more capacity (e.g., load, bandwidth) is available and latency requirements can still be satisfied, traffic of the virtual network may be rerouted via this physical node or connection. For that purpose, the slice management system 220 may, directly or via the interfacing system 240, send a rerouting request to the network management system 200, which may then reroute the virtual network over a different physical link. Another example is that it may be desired by the slice management system 220 to give traffic of certain network slices priority on a physical link. For that purpose, the slice management system 220 may, directly or via the interfacing system 240, instruct the network management system 200 to prioritize the traffic, for example according to priorities defined on a network slice level. Yet another example is that traffic of a network slice may be rate-limited by the network management system 200 at the direct or indirect request of the slice management system 220 in order to not hinder other virtual networks. For that purpose, the slice management system 220 may instruct the NFV-MANO 260 to modify the network slice.

Figure 4:
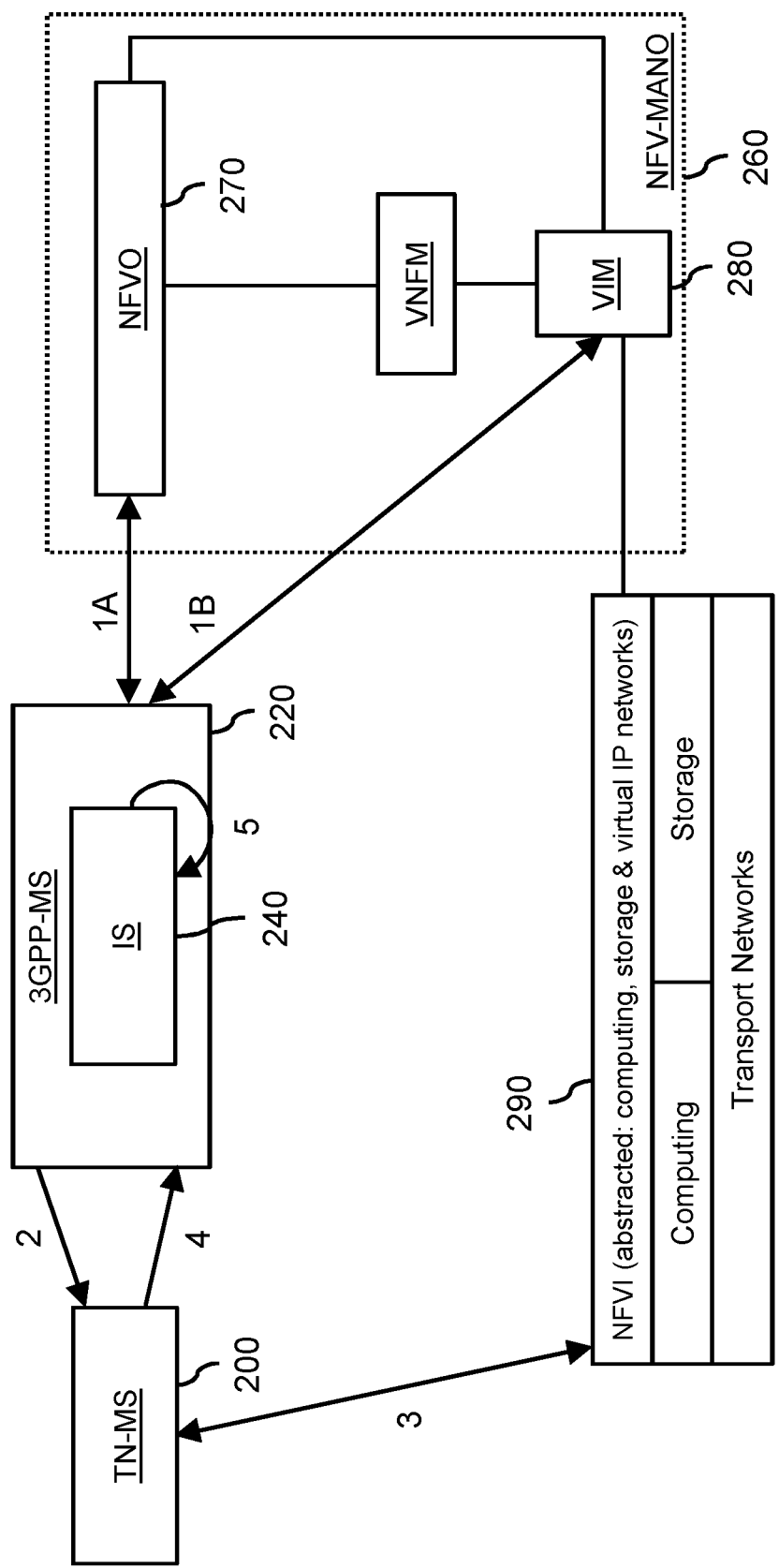
FIG. 4 shows a message flow in which the interfacing system (IS) retrieves overlay network information of a network slice using a separate message.

FIG. 4 shows a message flow in which the interfacing system 240 may retrieve overlay network information of a network slice using a separate message. This message flow may allow for the possibility to retrieve the overlay network information of a network slice in a separate step, which may be useful if the Os-Nfvo interface is used to retrieve the network identifier since this interface may not allow the network overlay type and the network overlay identifier to be retrieved. Accordingly, the network identifier retrieved in a step 1A via the Os-Nfvo interface from the NFV orchestrator 270 may be subsequently used to retrieve, in a step 1B, the network overlay type and the network overlay identifier from the virtualized infrastructure manager 280. The steps or messages 2 to 5 correspond to those as described with reference to FIG. 3.

Figure 5:
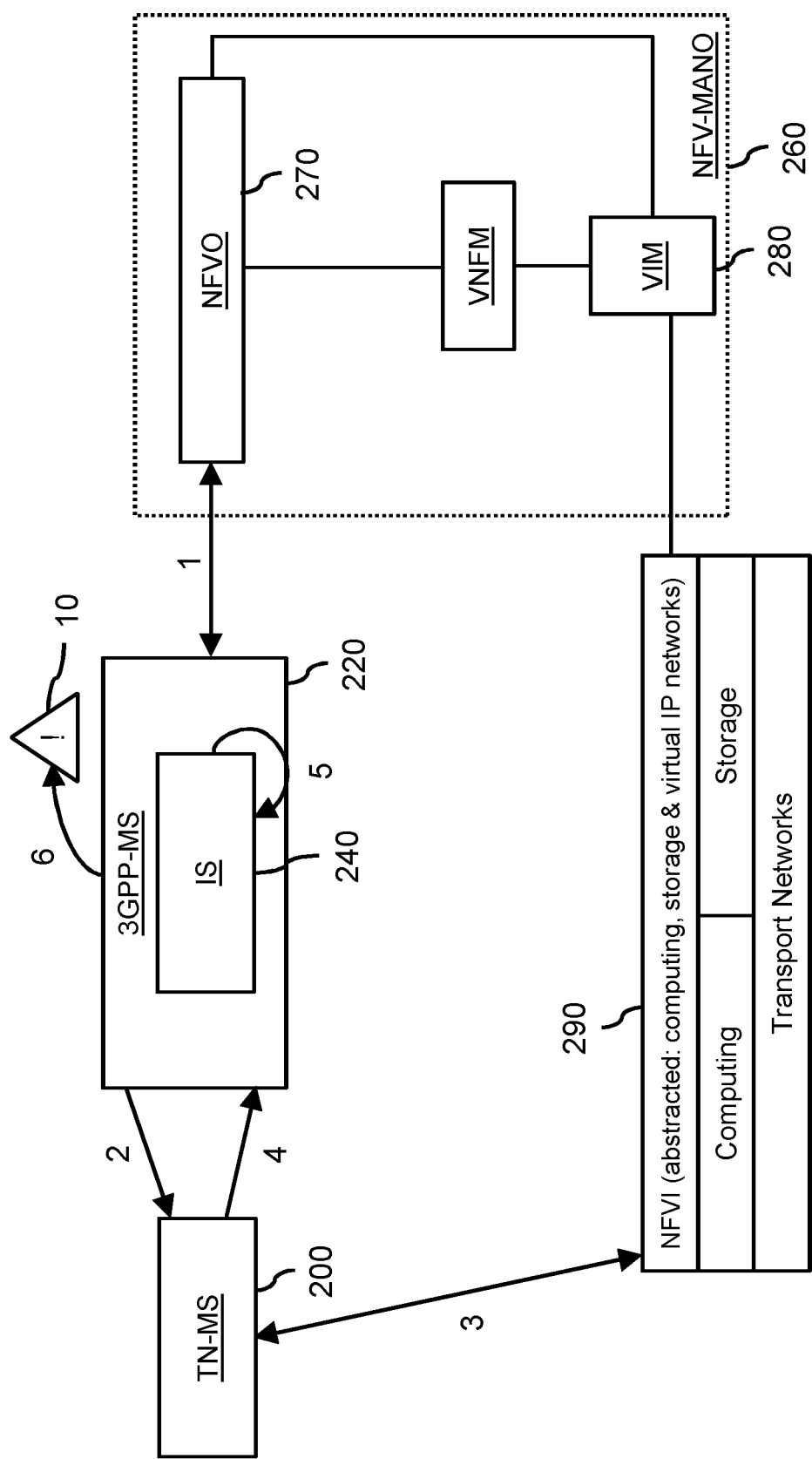
FIG. 5 shows a message flow in which the slice management system (3GPP-MS) is configured to generate an alarm signal based on utilization data or similar type of information received from the interfacing system (IS)

FIG. 5 shows a message flow in which the slice management system 220 may be configured to generate an alarm signal based on utilization data or similar type of information received from the interfacing system 240. Namely, based on the overview of the current network slice usage in terms of bandwidth, load, etc., the slice management system 220 may generate an alarm 10, for example if certain static or dynamically defined monitoring thresholds are reached. The alarm may be included in an alarm list of the slice management system. Alternatively or additionally, e.g., as a follow up, the alarm may also be transmitted, e.g., in a step 6 following the step 5, e.g., to the operator of the network slice of a third party that is using the network slice, for example to inform the operator or third party and to take action if necessary. The steps or messages 1 to 5 correspond to those as described with reference to FIG. 3.

Figure 6:
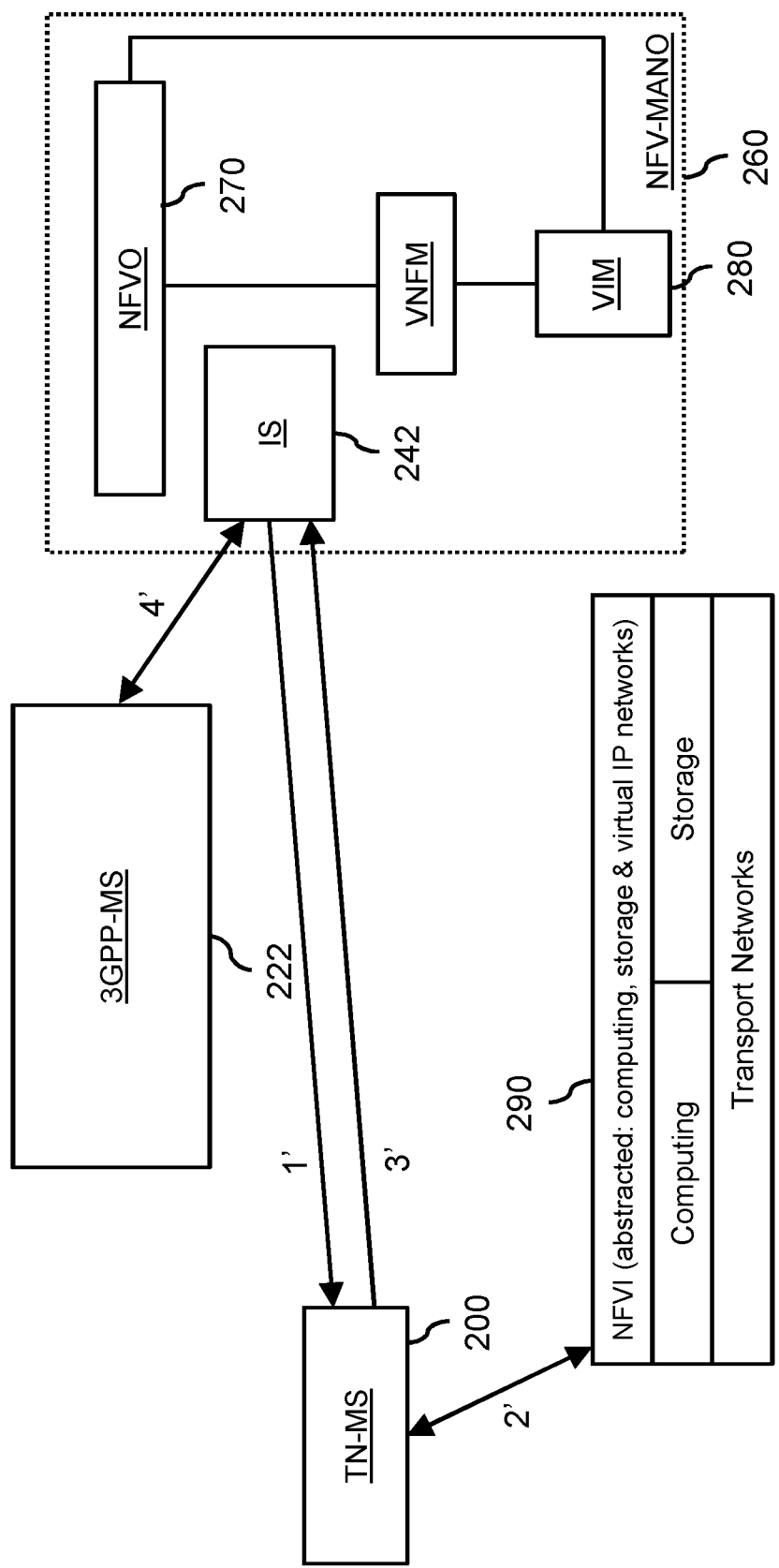
FIG. 6 shows a message flow in which the interfacing system (IS) is part of the network virtualization system (NFV-MANO)

FIG. 6 shows a message flow in which the interfacing system is part of the network virtualization system, and in particular of the NFV-MANO 260. Here, the term 'part of' is to be understood as including that the functionality of the interfacing system is integrated with the functionality of the NFV-MANO 260. A challenge may be that the NFV-MANO 260 may not have knowledge on network slices but rather on network services. The functionality of the interfacing system may thus be somewhat different, in that a network slice may be directly mapped to a network service in the NFV-MANO 260. This implementation of the interfacing system may be called a Network Service Transport Network mapper (NS-TN mapper) 242. The NS-TN mapper 242 may have knowledge of which network services are created and knowledge of which virtual networks are created for each network service. For each virtual network, the NS-TN mapper 242 may have knowledge on the network overlay type and the network overlay identifier. With this information, the NS-TN mapper 242 may directly communicate with the network management system 200, for example using the following message flow:

1' The NS-TN mapper 242 may instruct the network management system 200 to monitor the transport and specific overlay networks.

2' The network management system 200 may instruct the network nodes to activate monitoring of corresponding traffic flows. In response, the network nodes may send monitoring data to the network management system 200.

3' The network management system 200 may periodically send the aggregated data as utilization data to the NS-TN mapper 242.

4' The NS-TN mapper 242 may map the utilization data to the network services, and may further map it to the corresponding NSI. The NS-TN mapper 242 may then send the utilization data with the mapping to the network services and/or the mapping to the corresponding NSI to the slice management system 222.

Figure 7:
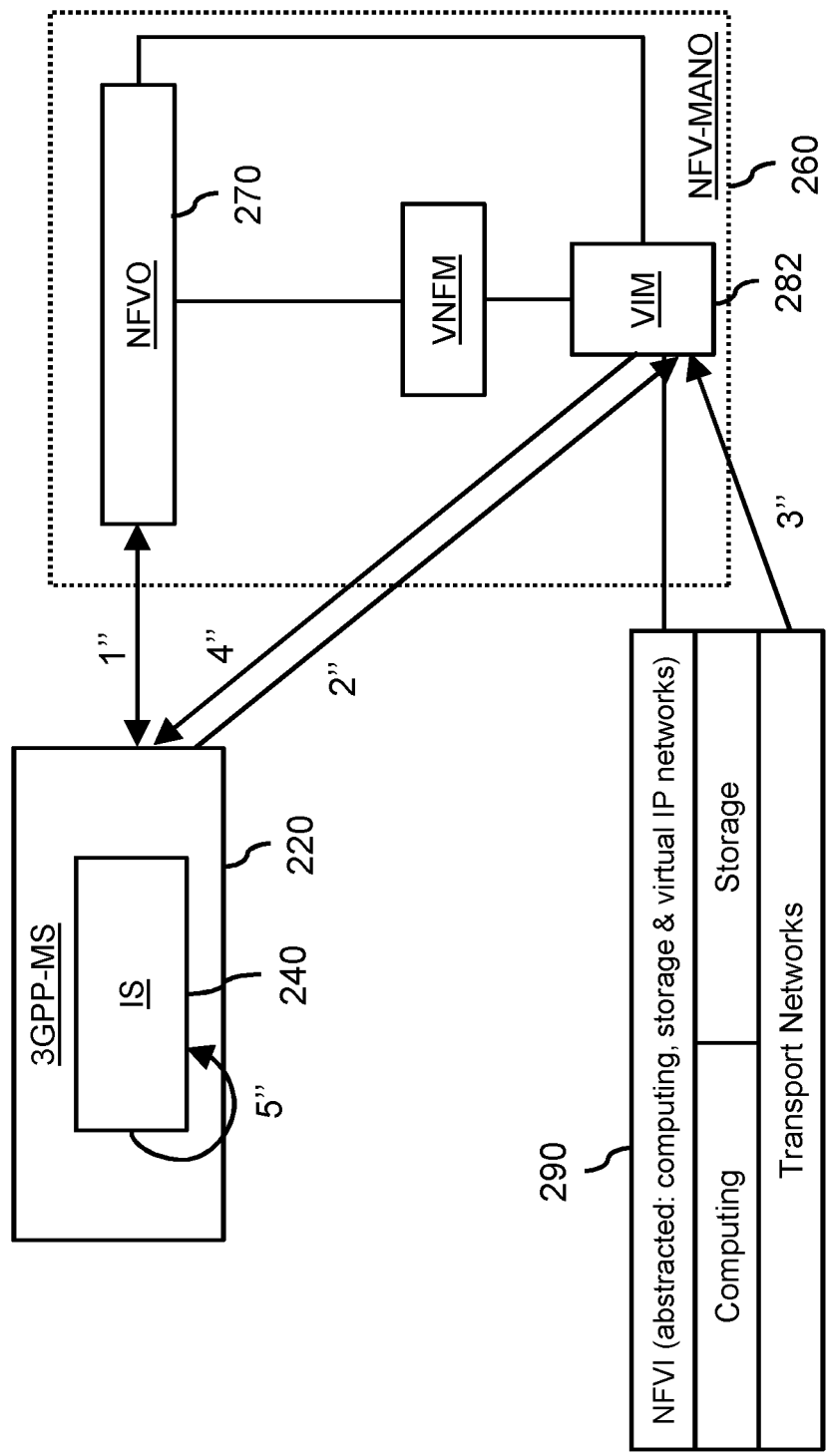
FIG. 7 shows a message flow in which a virtual infrastructure manager (VIM) of the network virtualization system (NFV-MANO) replaces the network management system (TN-MS) and in which the interfacing system (IS) interfaces between the virtual infrastructure manager (VIM) and the slice management system (3GPP-MS)

FIG. 7 shows a message flow in which a virtual infrastructure manager 282 of the NFV-MANO 260 replaces or integrates the network management system and in which the interfacing system 240 interfaces between the virtual infrastructure manager 280 and the slice management system 220. Essentially, if the virtual infrastructure manager 282 is configured to also manage the transport network, then the messages or steps 1-5 of FIG. 3 between the interfacing system 240 and the network management system may now apply to the interaction between the interfacing system 240 and the virtual infrastructure manager, mutatis mutandis, in that steps 1"-5" of FIG. 7 correspond to steps 1-5 of FIG. 3 applied to the virtual infrastructure manager 282.

Figure 8:
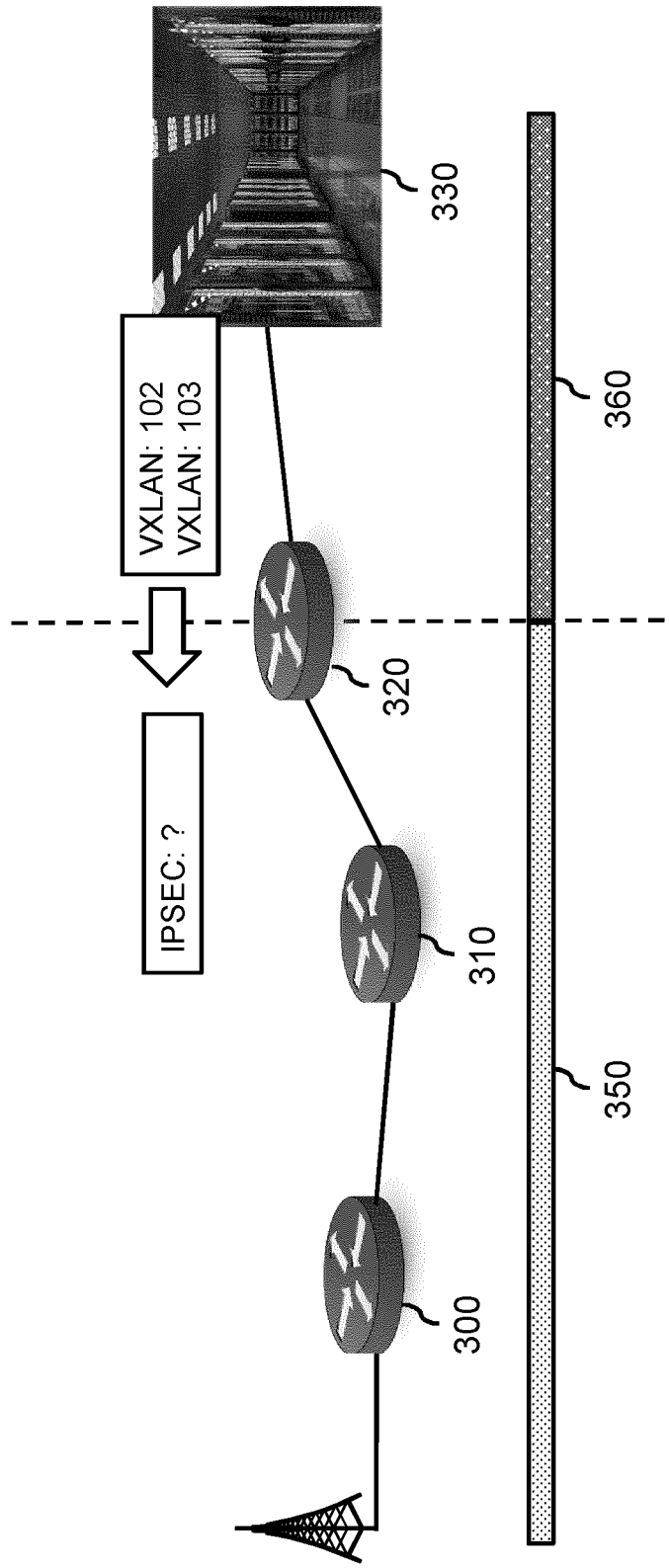
FIG. 8 illustrates how encrypted traffic may be monitored for the purpose of obtaining utilization data indicative of at least one of: a bandwidth capacity, computing capacity and storage capacity of physical links via which traffic of one or more virtual networks of one or more network slices is routed.

FIG. 8 illustrates how encrypted traffic may be monitored for the purpose of obtaining utilization data indicative of at least one of: a bandwidth capacity, computing capacity and storage capacity of physical links via which traffic of one or more virtual networks of one or more network slices is routed. It is noted that certain parts of the transport network (TN) can be encrypted. This may be required if parts of the TN go over untrusted infrastructure. This is illustrated in FIG. 8, which shows a transport network comprising at least an edge router 300, a further non-edge router 310, a security gateway 320 and a core network 330. While the data communication in the core network 330 and between the core network 330 and the security gateway 320 may remain unencrypted 360, the data communication from the security gateway 320 onwards to the routers 310, 300 may be encrypted 350. Accordingly, the traffic of network slices, which may in the specific example of FIG. 8 be routed via virtual networks in the form of VXLANs which may be mapped to UDP ports 102, 103, may now transmitted in an encrypted manner, e.g., via IP security (IPSec).

Such encryption of traffic may for example be used by mobile network operators for traffic which is transmitted outside of the core network 330 or a data center. This may provide an extra layer of security. However, this extra layer of security may create an extra layer of complexity for network monitoring. In particular, if the encryption takes place on layer 3 of the transport network, then the content of the encrypted traffic may not be distinguished anymore. This means that virtual networks may in principle not be monitored anymore in the transport network. To address this, the interfacing system and/or the network management system as described in this specification may be configured for, if the traffic of a respective virtual network is transmitted via an encrypted tunnel, administering a correspondence between an identifier of the virtual network and a network port via which the traffic enters the encrypted tunnel to enable, based on the network port, identifying and monitoring the at least one of: bandwidth capacity, computing capacity and storage capacity of the one or more physical links via which the traffic of the virtual network is routed. This may be further explained with reference to FIGS. 9A-9C.

Figure 9B:
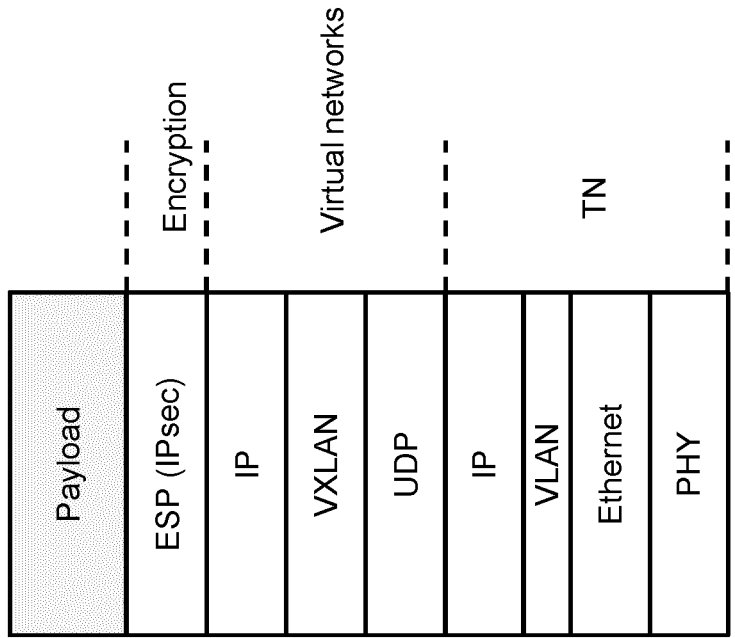
FIG. 9B shows an open systems interconnection (OSI) stack in which encryption is performed within each virtual extensible local area network (VXLAN)
Figure 9A:
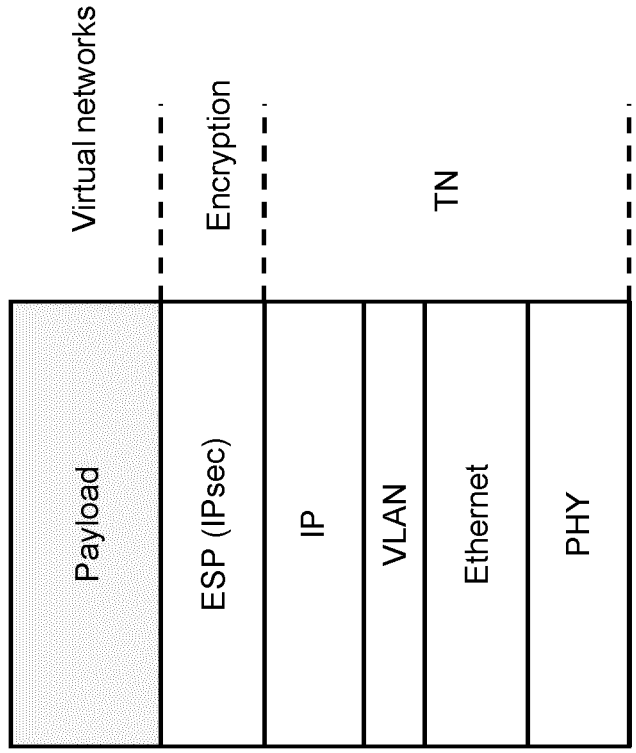
FIG. 9A shows an open systems interconnection (OSI) stack in which encryption is performed on the transport network level.

FIG. 9A shows an open systems interconnection (OSI) stack in which encryption is performed on the transport network level, and FIG. 9B shows an open systems interconnection (OSI) stack in which encryption is performed within each virtual extensible local area network (VXLAN). More specifically, as shown in FIG. 9A, in a default scenario, encryption may take place directly after the first IP header. This method may prevent VXLAN monitoring in the encrypted part of the network. A straightforward solution for this could be to apply encryption on a later layer after the VXLAN tunneling, as is shown in FIG. 9B. This way, traffic may still be distinguished in the transport network. However, this approach also has a drawback in that each virtual tunnel end point (VTEP) may need to encrypt its traffic before having the traffic enter a VXLAN tunnel. This approach may not be desired because of performance requirements and because traffic in the core network may not need to be encrypted.

FIG. 9C shows an open systems interconnection (OSI) stack in which an additional user datagram protocol (UDP) layer is added. This additional UDP layer may be used to map each VXLAN port to a different UDP source port. Accordingly, the security gateway may still perform the encryption and the traffic in the core network may remain unencrypted. It may only be needed to maintain a list of which VXLAN is mapped to which UDP port. This may be done by the security gateway and the network management system, or by the security gateway and the interfacing system. The messages or steps 1-5 of FIG. 3 may be maintained, except that step 2 may be extended with an instruction to the network management system to map VXLAN tunnel identifiers to an UDP port at points where traffic transitions from a non-encrypted to an encrypted environment and with an instruction to monitor these UDP ports in the encrypted environment instead of VXLANs. In general, this approach may also be applied to other types of virtual networks and to other (e.g., non-UDP) types of network ports or to a security parameter index (SPI). Accordingly, to account for encrypted traffic, the network management system or the interfacing system may administer a correspondence between network overlay identifiers and (UDP) port or SPI.

Another embodiment of the interfacing system may relate to the following. The network management system may in many cases be a traditional network management system for routers and switches. However, the transport network may also be implemented on the basis of the software defined network (SDN) paradigm where a central controller has an overview of the network. This controller may manage, monitor and instruct switches and routers in the transport network. In such an embodiment, the SDN controller may be seen as the network management system since the SDN controller may also instruct the routers and switches to monitor certain traffic flows and periodically report back to the SDN controller. The SDN controller may then send the aggregated data as utilization data back to the interfacing system, which in turn may provide the utilization data to the slice management system. In other words, the network management system as described elsewhere may be an SDN controller.

Another embodiment of the interfacing system may relate to the following. The functionality of the interfacing system as described elsewhere, or part thereof, may be provided by a function, which may for example be called a STN mapper function. This function may be comprised of smaller functionalities. These smaller functionalities may be provided by micro services and may be co-located with other functionalities and not necessarily grouped physically or virtual together. Accordingly, the complete or parts of the functionality that is described in this specification with reference to the interfacing system or the STN mapper may be implemented using a service-based architecture (SBA) by one or more different management services. In the 3GPP management domain, such a management service is known under the acronym 'MnS'.

Yet another embodiment of the interfacing system may relate to the following. As described elsewhere, the network management system may at regular or irregular intervals send utilization data to the interfacing system. Alternatively, this information flow may be triggered by the interfacing system or the slice management system, for example in a situation where failures or underperformance of network slices or services are detected by the slice management system. In this embodiment, step 4 of FIG. 3 may be replaced by a step 4A where the interfacing system 240 requests utilization data and a step 4B in which the network management system 200 responds.

Figure 10:
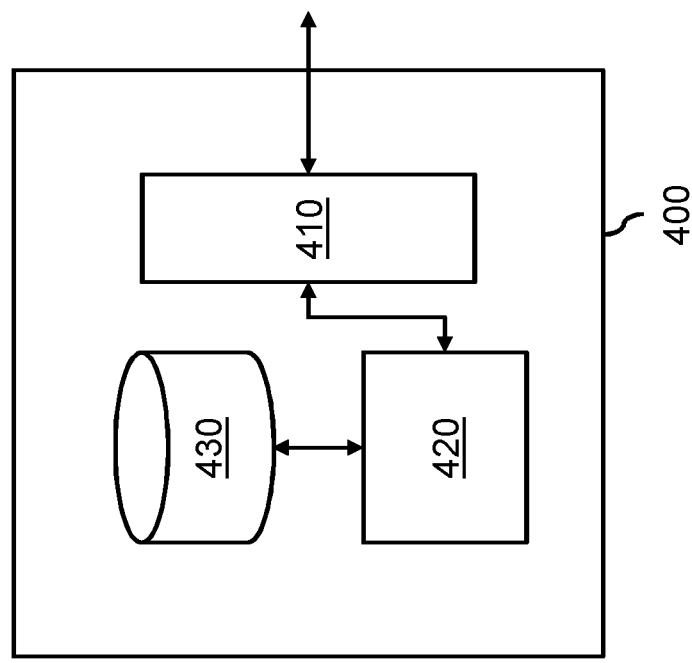
FIG. 10 shows a system comprising a data communication interface subsystem, a processor subsystem and a data storage.

FIG. 10 shows a system 400 comprising a data communication interface subsystem 410, a processor subsystem 420 and a data storage 430. The system 400 may represent any individual system as described in this specification, including but not limited to the interfacing system, the network management system configured to interface with the interfacing system, the slice management system configured to interface with the interfacing system or the slice management system comprising interface system, and the network virtualization system configured to interface with the interfacing system or the network virtualization system comprising interface system.

The data communication interface subsystem 410 may be used by the system 400 to communicate with other entities. In some examples, the data communication interface subsystem 410 may comprise or consist of a network interface, e.g., a wired network interface based on Ethernet or optical fiber or a wireless network interface such as a microwave or satellite communication interface. In other examples, the data communication interface subsystem 410 may comprise several network interfaces, for example to communicate via a different networks or different network segments with different entities. Each of the network interfaces may be of a type as described above. In yet other examples, the data communication interface subsystem 410 may comprise an internal communication interface, for example in cases where the system 400 is integrated into another system. Such an internal communication interface may be a software interface, e.g., based on an application programming interface (API). In such examples, the data communication interface subsystem 410 may further comprise a network interface for external communication. It is noted that each communication interface or network interface may be a physical interface, e.g., connected to a physical medium, but also a logical interface, e.g., defined by software.

The processor subsystem 420 of the system 400 may be configured, e.g., by hardware design or software, to perform the operations described in this specification in as far as pertaining to the interfacing system, the network management system, the slice management system or the network virtualization system. For example, the processor subsystem 420 may be embodied by a single Central Processing Unit (CPU), but also by a combination or system of such CPUs and/or other types of processing units. In general, the system 400 may be embodied by a (single) device or apparatus, e.g., a network server. However, the system 400 may also be embodied by a distributed system of such devices or apparatuses, e.g., a distributed system of network servers. In such cases, the processor subsystem 420 may also be a distributed system of processors, e.g., of CPUs and/or other types of processing units.

FIG. 10 further shows the system 400 to comprise a data storage 430, such as a hard disk, a solid-state drive or an array of hard disks or an array of solid-state drives, which may be used by the system 400 for storing data. For example, the system 400 may as interfacing system administer mappings between network slices, virtual networks and physical links and may store utilization data of the physical links.

In general, the system 400 may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) of the system 400 may be implemented in the device or apparatus in the form of programmable logic, e.g., as a Field-Programmable Gate Array (FPGA). In general, each function may be implemented as a circuit.

Figure 11:
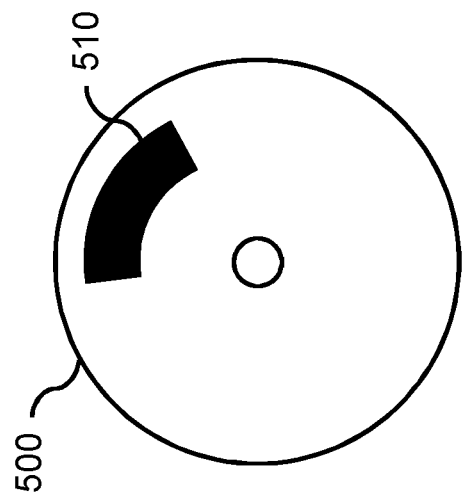
FIG. 11 shows a computer-readable medium comprising data.

It is noted that any of the methods described in this specification, for example in any of the claims, may be implemented on a computer as a computer-implemented method, as dedicated hardware, or as a combination of both. Instructions for the computer, e.g., executable code, may be stored on a computer-readable medium 500 as for example shown in FIG. 11, e.g., in the form of a series 510 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 11 shows by way of example an optical storage device 500.

In an alternative embodiment of the computer-readable medium 500 of FIG. 11, the computer-readable medium 500 may comprise transitory or non-transitory data 510 representing utilization data as described elsewhere in this specification.

Figure 12:
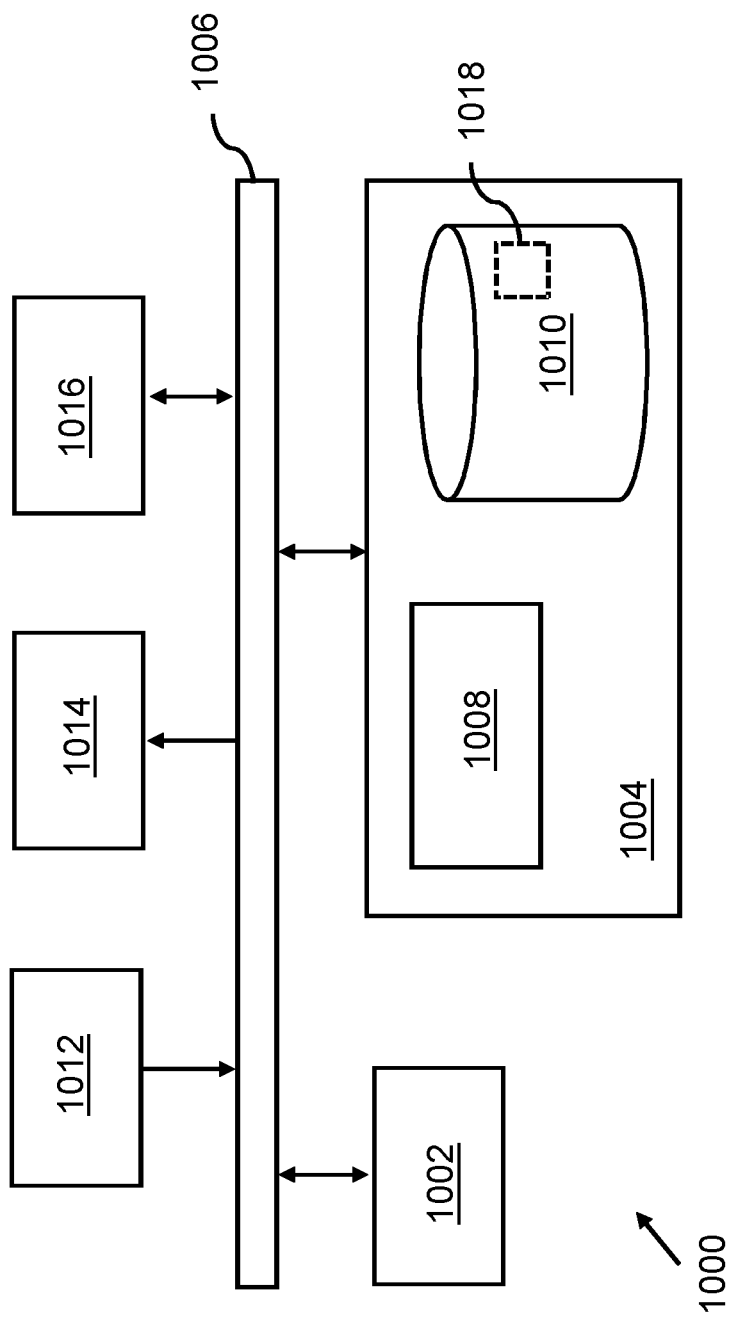
FIG. 12 shows an exemplary data processing system.

FIG. 12 is a block diagram illustrating an exemplary data processing system that may be used in the embodiments described in this specification. Such data processing systems include data processing entities described in this specification, including but not limited to the interfacing system, the network management system, the slice management system and the network virtualization system. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 12, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the interfacing system. In that case, application 1018 may represent an application that, when executed, configures data processing system 1000 to perform the functions described herein with reference to the interfacing system. In another aspect, data processing system 1000 may implement the network management system. In that case, application 1018 may represent an application that, when executed, configures data processing system 1000 to perform the functions described herein with reference to the network management system. In another aspect, data processing system 1000 may implement the slice management system. In that case, application 1018 may represent an application that, when executed, configures data processing system 1000 to perform the functions described herein with reference to the slice management system. In another aspect, data processing system 1000 may implement the network virtualization system. In that case, application 1018 may represent an application that, when executed, configures data processing system 1000 to perform the functions described herein with reference to the network virtualization system.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An interfacing system for establishing an interface between a network management system and a slice management system of a telecommunication network, wherein:
   the network management system is configured for managing physical network equipment of a network having physical links, wherein the network supports instantiation of virtual networks over the physical links, and wherein the network management system is configured for administering, for a respective virtual network, via which one or more physical links traffic of the virtual network is routed,
   the slice management system is configured for instantiating and managing network slices which each comprise one or more of the virtual networks, and wherein
   the telecommunication network comprises a network virtualization system configured for instantiating virtual networks based on network service descriptions which represent respective network slices and administrating which one or more virtual networks are comprised in a respective network slice;
   the interfacing system comprising:
   a data communication interface subsystem for communicating with the slice management system, the network management system and the network virtualization system;
   a processor subsystem configured to, via the data communication interface subsystem:
      obtain identification data from the network virtualization system, wherein the identification data identifies, for at least one network slice, which one or more virtual networks are comprised in the respective network slice;
      based on the identification data, obtain utilization data from the network management system, wherein the utilization data is indicative of at least one of: a bandwidth capacity, computing capacity and storage capacity of one or more physical links via which traffic of the one or more virtual networks is routed; and
      provide the utilization data for the at least one network slice to the slice management system.

2. The interfacing system according to claim 1, wherein the processor subsystem is configured to, based on the identification data, instruct the network management system to monitor the one or more physical links via which the traffic of the one or more virtual networks is routed and to periodically generate the utilization data.

3. The interfacing system according to claim 1, wherein the processor subsystem is configured to periodically obtain the utilization data from the network management system by at least one of:
   subscribing with the network management system to periodically receive the utilization data from the network management system; and
   periodically sending a request to the network management system.

4. The interfacing system according to claim 1, wherein the processor subsystem is configured to, in response to obtaining the utilization data, instruct the network management system to at least one of:
- re-route at least part of the traffic of the one or more virtual networks via one or more different physical links; and
- apply a quality-of-service configuration to at least part of the traffic of the one or more virtual networks.

5. The interfacing system according to claim 4, wherein the processor subsystem is configured to instruct the network management system based on instructions from the slice management system.

6. The interfacing system according to claim 1, wherein the network virtualization system is a network function virtualization system which comprises a network function virtualization orchestrator and a virtual infrastructure manager, wherein the processor subsystem is configured to obtain the identification data by:
- obtaining a network identifier from the network function virtualization orchestrator; and
- based on the network identifier, obtaining the identification data from the virtual infrastructure manager.

7. The interfacing system according to claim 1, wherein the data communication interface subsystem comprises one or more network interfaces for communicating with at least one of: the slice management system, the network management system and the network virtualization system.

8. The interfacing system according to claim 1, wherein the network is a software defined network, wherein the network management system is represented by software defined network controller, and wherein the processor subsystem is configured to obtain the utilization data from the software defined network controller.

9. The interfacing system according to claim 1, wherein the network management system is represented by a virtual infrastructure manager, and wherein the processor subsystem is configured to obtain the utilization data from the virtual infrastructure manager.

10. The interfacing system according to claim 1, wherein the processor subsystem is configured to:
- obtain identification data for a set or all of the network slices managed by the slice management system;
- obtain utilization data associated with the set or all of the network slices;
- provide the utilization data of a selected network slice to the slice management system in response to receiving an identifier of the selected network slice from the slice management system.

11. The interfacing system according to claim 1, wherein the interfacing system and/or the network management system is configured for, if the traffic of a respective virtual network is transmitted via an encrypted tunnel, administering a correspondence between an identifier of the virtual network and a network port via which the traffic enters the encrypted tunnel to enable, based on the network port, identifying and monitoring the at least one of: bandwidth capacity, computing capacity and storage capacity of the one or more physical links via which the traffic of the virtual network is routed.

12. A slice management system, wherein:
- the slice management system comprises the interfacing system according to claim 1 as a subsystem; and
- the slice management system is configured to provide an identifier of a selected network slice to the interfacing system and to receive utilization data for the selected network slice from the interfacing system.

13. The slice management system according to claim 12, configured to generate an alarm signal if the bandwidth and/or the load of the one or more physical links exceeds a threshold and to:
- include the alarm signal in an alarm list of the slice management system; and/or
- provide the alarm signal to an operator of the network slice.

14. A network virtualization system comprising the interfacing system according to claim 1 as a subsystem.

15. A computer-implemented method of establishing an interface between a network management system and a slice management system of a telecommunication network, wherein:
- the network management system is configured for managing physical network equipment of a network having physical links, wherein the network supports instantiation of virtual networks over the physical links, and wherein the network management system is configured for administering, for a respective virtual network, via which one or more physical links traffic of the virtual network is routed,
- the slice management system is configured for instantiating and managing network slices which each comprise one or more of the virtual networks, and wherein
- the telecommunication network comprises a network virtualization system configured for instantiating virtual networks based on network service descriptions which represent respective network slices and administrating which one or more virtual networks are comprised in a respective network slice;
- the method comprising:
- obtaining identification data from the network virtualization system, wherein the identification data identifies, for at least one network slice, which one or more virtual networks are comprised in the respective network slice;
- based on the identification data, obtaining utilization data from the network management system, wherein the utilization data is indicative of at least one of: a bandwidth capacity, computing capacity and storage capacity of one or more physical links via which traffic of the one or more virtual networks is routed; and
- providing the utilization data for the at least one network slice to the slice management system.

16. A computer-readable medium comprising non-transitory data representing a computer program, the computer program comprising instructions for causing a processor system to perform the method according to claim 15.

* * * * *